United States Patent
Dalavi et al.

(10) Patent No.: US 11,894,518 B2
(45) Date of Patent: Feb. 6, 2024

(54) ELECTROLYTES FOR STABLE CYCLING OF HIGH CAPACITY LITHIUM BASED BATTERIES

(71) Applicant: Zenlabs Energy, Inc., Fremont, CA (US)

(72) Inventors: Swapnil J. Dalavi, Newark, CA (US); Shabab Amiruddin, Menlo Park, CA (US); Bing Li, Unions City, CA (US)

(*) Notice: Subject to any disclaimer, the term of this patent is extended or adjusted under 35 U.S.C. 154(b) by 23 days.

(21) Appl. No.: 17/400,948

(22) Filed: Aug. 12, 2021

(65) Prior Publication Data

US 2021/0376383 A1 Dec. 2, 2021

Related U.S. Application Data

(62) Division of application No. 16/519,354, filed on Jul. 23, 2019, now Pat. No. 11,121,407, which is a
(Continued)

(51) Int. Cl.
*H01M 10/0567* (2010.01)
*H01M 10/052* (2010.01)
(Continued)

(52) U.S. Cl.
CPC ..... *H01M 10/0567* (2013.01); *H01M 10/052* (2013.01); *H01M 10/0525* (2013.01);
(Continued)

(58) Field of Classification Search
CPC ........... H01M 10/0567; H01M 10/052; H01M 10/0525; H01M 10/0568; H01M 10/0569;
(Continued)

(56) References Cited

U.S. PATENT DOCUMENTS

| 4,857,423 A | 8/1989 | Abraham et al. |
| 5,192,629 A | 3/1993 | Guyomard et al. |

(Continued)

FOREIGN PATENT DOCUMENTS

| CN | 101587970 A | 11/2009 |
| JP | 2005-332707 A | 12/2005 |

(Continued)

OTHER PUBLICATIONS

Profatilova et al., "Enhanced thermal properties of the solid electrolyte interphase formed on graphite in an electrolyte with fluoroethylene carbonate," Mar. 20, 2009, Electrochimica Acta, 54, 4445-4450. (Year: 2009).*

(Continued)

*Primary Examiner* — Matthew W Van Oudenaren

(57) ABSTRACT

Electrolytes are described with additives that provide good shelf life with improved cycling stability properties. The electrolytes can provide appropriate high voltage stability for high capacity positive electrode active materials. The core electrolyte generally can comprise from about 1.1M to about 2.5M lithium electrolyte salt and a solvent that consists essentially of fluoroethylene carbonate and/or ethylene carbonate, dimethyl carbonate and optionally no more than about 40 volume percent methyl ethyl carbonate, and wherein the lithium electrolyte salt is selected from the group consisting of $LiPF_6$, $LiBF_4$ and combinations thereof. Desirable stabilizing additives include, for example, dimethyl methylphosphonate, thiophene or thiophene derivatives, and/or LiF with an anion complexing agent.

12 Claims, 6 Drawing Sheets

Related U.S. Application Data division of application No. 13/958,197, filed on Aug. 2, 2013, now Pat. No. 10,411,299.

(51) Int. Cl.
*H01M 10/0525* (2010.01)
*H01M 10/0568* (2010.01)
*H01M 10/0569* (2010.01)

(52) U.S. Cl.
CPC .... *H01M 10/0568* (2013.01); *H01M 10/0569* (2013.01); *H01M 2300/0034* (2013.01); *H01M 2300/0037* (2013.01); *Y02T 10/70* (2013.01)

(58) Field of Classification Search
CPC ......... H01M 10/0566; H01M 10/0564; H01M 2300/0034; H01M 2300/0037; H01M 2300/0028; H01M 2300/004; H01M 2300/0042
See application file for complete search history.

(56) References Cited

U.S. PATENT DOCUMENTS

| | | | |
|---|---|---|---|
| 5,240,790 A | 8/1993 | Chua et al. | |
| 5,422,203 A | 6/1995 | Guyomard et al. | |
| 5,484,669 A | 1/1996 | Okuno et al. | |
| 5,521,027 A | 5/1996 | Okuno et al. | |
| RE35,818 E | 6/1998 | Tahara et al. | |
| 5,830,600 A | 11/1998 | Narang et al. | |
| 5,908,717 A | 6/1999 | Pendalwar et al. | |
| 5,922,494 A | 7/1999 | Barker et al. | |
| 5,994,000 A | 11/1999 | Ein-Ein et al. | |
| 5,998,065 A | 12/1999 | Tsutsumi et al. | |
| 6,045,951 A | 4/2000 | Wendsjo et al. | |
| 6,153,338 A | 11/2000 | Gan et al. | |
| 6,291,107 B1 | 9/2001 | Shimizu et al. | |
| 6,346,351 B1 | 2/2002 | Yde-Anderson et al. | |
| 6,444,370 B2 | 9/2002 | Barker et al. | |
| 6,455,200 B1 | 9/2002 | Prakash et al. | |
| 6,482,549 B2 | 11/2002 | Yoshimura et al. | |
| 6,489,063 B1 | 12/2002 | Billaud et al. | |
| 6,492,064 B1 | 12/2002 | Smart et al. | |
| 6,506,524 B1 | 1/2003 | McMillian et al. | |
| 6,645,671 B2 | 11/2003 | Tsutsumi et al. | |
| 6,680,143 B2 | 1/2004 | Thackeray et al. | |
| 6,692,874 B2 | 2/2004 | Kim et al. | |
| 6,746,804 B2 | 6/2004 | Gan et al. | |
| 6,783,896 B2 | 8/2004 | Tsujioka et al. | |
| 6,787,267 B2 | 9/2004 | Tsujioka et al. | |
| 6,787,269 B2 | 9/2004 | Sekino et al. | |
| 6,855,458 B1 | 2/2005 | Kim et al. | |
| 6,942,949 B2 | 9/2005 | Besenhard et al. | |
| 6,958,198 B2 | 10/2005 | Iwamoto et al. | |
| 7,022,145 B2 | 4/2006 | Kim et al. | |
| 7,074,523 B2 | 7/2006 | Arai et al. | |
| 7,172,834 B1 | 2/2007 | Jow et al. | |
| 7,226,704 B2 | 6/2007 | Panitz et al. | |
| 7,235,334 B2 | 6/2007 | Kim et al. | |
| 7,255,965 B2 | 8/2007 | Xu et al. | |
| 7,311,993 B2 | 12/2007 | Ivanov et al. | |
| 7,348,103 B2 | 3/2008 | Ivanov et al. | |
| 7,378,190 B2 | 5/2008 | Yanai et al. | |
| 7,452,636 B2 | 11/2008 | Yanai et al. | |
| 7,455,933 B2 | 11/2008 | Shimura et al. | |
| 7,465,517 B2 | 12/2008 | Ivanov et al. | |
| 7,482,101 B2 | 1/2009 | Tsuda et al. | |
| 7,491,471 B2 | 2/2009 | Yamaguchi et al. | |
| 7,754,389 B2 | 7/2010 | Yamaguchi et al. | |
| 8,277,974 B2 | 10/2012 | Kumar et al. | |
| 8,389,160 B2 | 3/2013 | Venkatachalam et al. | |
| 8,394,534 B2 | 3/2013 | Lopez et al. | |
| 8,399,136 B2 | 3/2013 | Ohashi et al. | |
| 8,465,873 B2 | 6/2013 | Lopez et al. | |
| 8,475,959 B2 | 7/2013 | Venkatachalam et al. | |
| 2001/0031396 A1 | 10/2001 | Tsutsumi et al. | |
| 2002/0018940 A1* | 2/2002 | Nirasawa | H01M 10/0567 429/231.95 |
| 2002/0037458 A1 | 3/2002 | Yamagushi et al. | |
| 2002/0084445 A1 | 7/2002 | Garbe | |
| 2002/0102466 A1 | 8/2002 | Hwang et al. | |
| 2003/0165733 A1 | 7/2003 | Takehara et al. | |
| 2005/0008941 A1 | 1/2005 | Kim et al. | |
| 2005/0031963 A1* | 2/2005 | Im | H01M 10/0569 429/200 |
| 2005/0042520 A1 | 2/2005 | Roh et al. | |
| 2005/0233207 A1 | 10/2005 | Kim | |
| 2006/0172201 A1 | 8/2006 | Yasukawa et al. | |
| 2006/0194119 A1 | 8/2006 | Son et al. | |
| 2006/0210883 A1 | 9/2006 | Chen et al. | |
| 2006/0228626 A1 | 10/2006 | Kawashima et al. | |
| 2006/0269834 A1 | 11/2006 | West et al. | |
| 2006/0281012 A1 | 12/2006 | Ugawa et al. | |
| 2006/0286459 A1 | 12/2006 | Zhao et al. | |
| 2007/0178380 A1 | 8/2007 | Iwanaga et al. | |
| 2007/0287071 A1 | 12/2007 | Chica et al. | |
| 2008/0063945 A1 | 3/2008 | Ivanov et al. | |
| 2008/0131772 A1 | 6/2008 | Jambunathan et al. | |
| 2008/0220336 A1 | 9/2008 | Mun et al. | |
| 2008/0254353 A1 | 10/2008 | Takezawa | |
| 2008/0254361 A1 | 10/2008 | Horikawa | |
| 2009/0111028 A1 | 4/2009 | Lee et al. | |
| 2009/0142670 A1 | 6/2009 | Wang et al. | |
| 2009/0233178 A1 | 9/2009 | Saidi et al. | |
| 2009/0253046 A1 | 10/2009 | Smart et al. | |
| 2010/0035147 A1 | 2/2010 | Kotato et al. | |
| 2010/0086854 A1 | 4/2010 | Kumar et al. | |
| 2010/0119942 A1 | 5/2010 | Kumar | |
| 2010/0167121 A1 | 7/2010 | Arai et al. | |
| 2011/0076556 A1 | 3/2011 | Karthikeyan et al. | |
| 2011/0111298 A1 | 5/2011 | Lopez et al. | |
| 2011/0117446 A1 | 5/2011 | Lucht et al. | |
| 2011/0136019 A1* | 6/2011 | Amiruddin | H01M 10/0525 429/332 |
| 2011/0165474 A1 | 7/2011 | Im et al. | |
| 2011/0236751 A1 | 9/2011 | Amiruddin et al. | |
| 2011/0244331 A1 | 10/2011 | Karthikeyan et al. | |
| 2012/0028105 A1 | 2/2012 | Kumar et al. | |
| 2012/0070725 A1 | 3/2012 | Venkatachalam et al. | |
| 2012/0070746 A1 | 3/2012 | Mihaylik et al. | |
| 2012/0295155 A1 | 11/2012 | Deng et al. | |
| 2013/0157147 A1 | 6/2013 | Li et al. | |

FOREIGN PATENT DOCUMENTS

| | | |
|---|---|---|
| JP | 2007-165111 A | 6/2007 |
| JP | 2007-250440 A | 9/2007 |
| JP | 2010-287512 A | 12/2010 |
| WO | 2004-040687 A1 | 5/2004 |
| WO | 2008-079670 A1 | 7/2008 |

OTHER PUBLICATIONS

Abouimrane et al., 3-Hexylthiophene as a Stabilizing Additive for High Voltage Cathodes in Lithium-Ion Batteries, J. Electrochem. Soc., 160(2):A268-A271 (2013).

Achiha et al., "Electrochemical Behavior of Nonflammable Organo-Fluorine Compounds for Lithium Ion Batteries," Journal of the Electrochemical Society, 156(6):A483-A488 (2009).

Arai et al. "Air Product's StabiLife™ Electrolyte Salts for Lithium Ion Batteries," Product Brochure; Air Products and Chemicals, Inc., Allentown, PA.

Chen et al., "Develop & evaluate materials & additives that enhance thermal and overcharge abuse," presentation for Argonne National Laboratory, May 19, 2009.

Choi et al., "Effect of fluoroethylene carbonate additive on interfacial properties of silicon thin-film electrode," Journal of Power Sources, 161(2):1254-1259 (2006) (Abstract).

Ishikawa et al., ""Li-ion Battery Performance with FSI-based Ionic Liquid Electrolyte and Fluorinated Solvent-based Electrolyte,"" ECS Trans. 33:29-36 (2011) (Abstract).

(56) References Cited

OTHER PUBLICATIONS

Kang et al., "Enhancing the rate capability of high capacity xLi2MnO3 (1-x)LiMO2 (M=Mn, Ni, Co) electrodes by Li—Ni—PO4 treatment," Electrochemistry Communications 11:748-751 (2009).

Lee et al., Effect of an organic additive on the cyclign performance and thermal stability of lithium-ion cells assembled with carbon anode and LiNi1/3Co1/3Mn1/3O2 cathode, J. Power Sources, 196:6997-7001 (2011).

Lee et al., "Synthesis and Study of New Cyclic Boronate Additives for Lithium Battery Electrolytes," J. Electrochemical Society, 149(11):A1460-A1465 (2002) (Abstract).

Li et al., "Inhibition of the Detrimental Effects of Water Impurities in Lithium-Ion Batteries," Electrochemical and Solid State Letters, 10(4):A115-A117 (2007).

Li et al., "Additives for Stabilizing LiPF6-Based Electrolytes Against Thermal Decomposition," Journal of the Electrochemical Society, 152(7):A1361-A1365 (2005).

Liu et al., "Effect of electrolyte additives on improving the cycle and calendar life of graphite/Li1.1(Ni1/3Co1/3Mn1/3)0.9O2 Li-ion cells," J. Power Sources, 174:852-855 (2007).

"Market Insight: Tasks of Korean rechargeable electrolyte industry," Solar & Energy Column published Dec. 27, 2010, http://www.solarnenergy.com/eng/info/show.php?c_id=4899 (viewed Jun. 23, 2011).

McMillan et al. "Fluoroethylene carbonate electrolyte and its use in lithium ion batteries with graphite anodes," Journal of Power Sources, 81-82:20-26 (1999) (Abstract).

Plichta et al., "A low-temperature electrolyte for lithium and lithium-ion batteries," Journal of Power Sources, 88:192-196 (2000).

Profatilova et al., "Enhanced thermal properties of the solid electrolyte interphase formed on graphite in an electrolyte with fluoroethylene carbonate," Electrochimica Acta, 54:4445-4450 (2009).

Schweiger et al., "Optimization of Cycling Behavior of Lithium Ion Cells at 60° C. by Additives for Electrolytes Based on Lithium bis[1,2-oxalato(2-)-O,O'] borate," Int. J. Electrochem. Sci., 3:427-443 (2008).

Smart et al., "Performance of low temperature electrolytes in experimental and prototype Li-ion cells," 5th International Energy Conversion Engineering Conference, St. Louis, Missouri Jun. 25-27, 2007, published by NASA's Jet Propulsion Laboratory, Pasadena California, 2007 (http://hdl.handle.net/2014/41350).

Sun et al., "Improved Elevated Temperature Cycling of LiMn2O4 Spinel Through the Use of a Composite LiF-Based Electrolyte," Electrochem. Solid-State Lett., 4(11):A184-A186 (2001) (Abstract).

Sun et al., "A New Additive for Lithium Battery Electrolytes Based on an Alkyl Borate Compound," J. Electrochemical Society, 149(3):A355-A359 (2002) (Abstract).

Tech Highlights: Graphite Anode Stabilization in Propylene Carbonate by Lithium Bis(oxalate)borate [From: Electrochem. Solid-State Lett., 5:A259 (2002)], prepared by Zenghe Liu et al., The Electrochemical Society Interface Spring 2003, p. 20.

"Tech Highlights: Chemical Analysis of Graphite/Electrolyte Interface in Lithium Bis(oxalato)borate-Based Electrolytes [From: Electrochem. Solid-State Lett., 6(7):A144 (2003)]," prepared by Venkat Srinivasan et al., The Electrochemical Society Interface Winter 2003, p. 30.

"Tech Briefs: Optimized Carbonate and Ester-Based Li-Ion Electrolytes," published by NASA's Jet Propulsion Laboratory, Pasadena, California (Apr. 1, 2008) (2 pages).

"Tech Briefs: Ester-Based Electrolytes for Low-Temperature Li-Ion Cells," published by NASA's Jet Propulsion Laboratory, Pasadena, California (Dec. 1, 2005) (1 page).

"Technical Support Package for Optimized Carbonate and Ester-Based Li-Ion Electrolytes," NASA Tech Briefs NPO-44974, published by NASA's Jet Propulsion Laboratory, Pasadena, California, 2008 (39 pages).

Xiang et al., "Dimethyl methylphosphonate (DMMP) as an efficient flame retardant additive for the lithium-ion battery electrolytes," Nov. 2007, Journal of Power Sources, vol. 173, 562-564.

Xu et al., Improved Performance of LiNi1.0Mn1.5O4 Cathodes with Electrolytes Containing Dimethylmethylphosphonate (DMMP), J. Electrochem. Soc., 159(12):A2130-A2134 (2012).

Zhang et al., "Tris(2,2,2-trifluoroethyl) phosphite as a co-solvent for nonflammable electrolytes in Li-ion batteries," Journal of Power Sources, 113:116-172 (2002).

Zheng et al., "The Effects of AlF3 Coating on the Performance of Li[Li0.2Mn0.54Ni0.13Co0.13]O2 Positive Electrode Material for Lithium-Ion Battery," Journal of the Electrochemical Society, 155(10):A775-A782 (2008).

\* cited by examiner

ELECTROLYTES FOR STABLE CYCLING OF HIGH CAPACITY LITHIUM BASED BATTERIES

CROSS REFERENCE TO RELATED APPLICATIONS

This application is a divisional of copending U.S. patent application Ser. No. 16/519,354 filed Jul. 23, 2019 to Dalavi et al., entitled "Electrolytes for Stable Cycling of High Capacity Lithium Based Batteries," which is a divisional of corresponding U.S. patent application Ser. No. 13/958,197 filed on Aug. 2, 2013 to Dalavi et al., entitled "Electrolytes for Stable Cycling of High Capacity Lithium Based Batteries," all incorporated herein by reference.

BACKGROUND

Lithium batteries are widely used in consumer electronics due to their relatively high energy density. Rechargeable batteries are also referred to as secondary batteries, and lithium ion secondary batteries generally have a negative electrode material that incorporates lithium when the battery is charged. For some current commercial batteries, the negative electrode material can be graphite, and the positive electrode material can comprise lithium cobalt oxide (LiCoO$_2$). In practice, only a modest fraction of the theoretical capacity of the positive electrode active material generally can be used. At least two other lithium-based positive electrode active materials are also currently in commercial use. These two materials are LiMn$_2$O$_4$, having a spinel structure, and LiFePO$_4$, having an olivine structure. These other materials have not provided any significant improvements in energy density.

Lithium based batteries are generally classified into two categories based on their application. The first category involves high power battery, whereby lithium based battery cells are designed to deliver high current (Amperes) for such applications as power tools and Hybrid Electric Vehicles (HEVs). However, by design, these battery cells are lower in energy since a design providing for high current generally reduces total energy that can be delivered from the battery. The second design category involves high energy batteries, whereby lithium based battery cells are designed to deliver low to moderate current (Amperes) for such applications as cellular phones, lap-top computers, Electric Vehicles (EVs) and Plug in Hybrid Electric Vehicles (PHEVs) with the delivery of higher total capacity.

Electrolytes provide for ionic conductivity through the batteries between the cathodes and anodes. For most commercial batteries, a liquid electrolyte is used. The properties of the electrolyte can influence significantly the battery performance. For outdoor use, such as for vehicles, the batteries are subjected to conditions spanning over a wide temperature range. It is also desirable for the batteries to operate over a large number of charge-discharge cycles so that the batteries can provide a larger economic value.

SUMMARY OF THE INVENTION

In a first aspect, the invention pertains to a electrolyte composition comprising solvent, from about 1.1M to about 2.5M lithium electrolyte salt, from about 0.01 to about 0.4 wt % dimethyl methylphosphonate and an optional lithium salt additive. Generally, the solvent can comprise fluoroethylene carbonate and/or ethylene carbonate, and a liquid organic solvent selected from the group consisting of dimethyl carbonate, methyl ethyl carbonate, γ-butyrolactone, γ-valerolactone or a combination thereof and wherein the lithium electrolyte salt is selected from the group consisting of LiPF$_6$, LiBF$_4$ and combinations thereof.

In further aspects, the invention pertains to lithium ion battery comprising a positive electrode, a negative electrode, and a separator separating the positive electrode, a negative electrode, wherein the positive electrode comprises an active material comprising a lithium rich metal oxide, and an electrolyte as described herein, in which the positive electrode active material has a specific capacity of at least about 140 mAh/g at a 1C rate discharged from 4.35V to 2V and wherein the battery has a capacity at the 500th cycle that is at least about 97.5% of the 5th cycle capacity when cycled at a discharge rate of 1C from 4.35V to 2.5V. In some embodiments, the negative electrode comprises graphitic carbon, the lithium rich metal oxide is approximately represented by the formula Li$_{1+b}$Ni$_\alpha$Mn$_\beta$Co$_\gamma$A$_\delta$O$_{2-z}$F$_z$, where b ranges from about 0.01 to about 0.3, α ranges from about 0 to about 0.4, β ranges from about 0.2 to about 0.65, γ ranges from 0 to about 0.46, δ ranges from 0 to about 0.15 and z ranges from 0 to about 0.2 with the proviso that both α and γ are not zero, and where A is a metal element different from Ni, Mn, Co, or a combination thereof, and the battery exhibits manganese dissolution of no more than about 140 parts per million by weight (ppm) within the negative electrode removed from the battery following a first charge 4.35V at constant current of, C/10, a discharge to 2.0V at C/10, a second charge to 4.35V at C/10, and storage after the second charge for a week at 60° C. at 100% state of charge and discharged prior to disassembly the analyze the negative electrode In additional aspects, the invention pertains to an electrolyte composition comprising solvent, from about 1.1M to about 2.5M lithium electrolyte salt, from about 1 to about 5 weight percent LiBOB, LiDFOB or combinations thereof, and from about 0.02 to about 0.5 weight percent thiophene or thiophene derivatives, in which the solvent consist essentially of fluoroethylene carbonate and/or ethylene carbonate, dimethyl carbonate and optionally no more than about 20 weight percent methyl ethyl carbonate relative to the total electrolyte weight, and wherein the lithium electrolyte salt is selected from the group consisting of LiPF$_6$, LiBF$_4$ and combinations thereof.

In other aspects, lithium ion battery comprises a positive electrode, a negative electrode, a separator separating the positive electrode and a negative electrode and an electrolyte of claim 10, wherein the positive electrode comprises an active material comprising a lithium rich metal oxide approximately represented by the formula Li$_{1+b}$Ni$_\alpha$Mn$_\beta$Co$_\gamma$A$_\delta$O$_{2-z}$F$_z$, where b ranges from about 0.01 to about 0.3, α ranges from about 0 to about 0.4, β ranges from about 0.2 to about 0.65, γ ranges from 0 to about 0.46, δ ranges from 0 to about 0.15 and z ranges from 0 to about 0.2 with the proviso that both α and γ are not zero, and where A is a metal element different from Ni, Mn, Co, or a combination thereof and an inorganic stabilization coating. In some embodiments, the electrolyte comprises solvent, from about 1.1M to about 2.5M lithium electrolyte salt and from about 0.02 to about 0.5 weight percent thiophene or thiophene derivatives, in which the solvent comprises ethylene carbonate and a liquid organic solvent selected from the group consisting of dimethyl carbonate, methyl ethyl carbonate, γ-butyrolactone, γ-valerolactone or a combination thereof and wherein the lithium electrolyte salt is selected from the group consisting of LiPF$_6$, LiBF$_4$ and combinations thereof.

Moreover, the invention pertains to an electrolyte composition comprising solvent, from about 1.1M to about 2.5M lithium electrolyte salt, from about 1 to about 5 weight percent LiBOB, LiDFOB or combinations thereof, from about 0.001 weight percent to about 0.2 weight percent LiF and an anion complexing agent in an amount by moles from about 0.25 to about 2.5 times the molar amount of LiF, wherein the solvent consist essentially of fluoroethylene carbonate and/or ethylene carbonate, dimethyl carbonate and optionally no more than about 40 volume percent methyl ethyl carbonate, and wherein the lithium electrolyte salt is selected from the group consisting of $LiPF_6$, $LiBF_4$ and combinations thereof.

DETAILED DESCRIPTION OF PREFERRED EMBODIMENTS

Figure 1A:
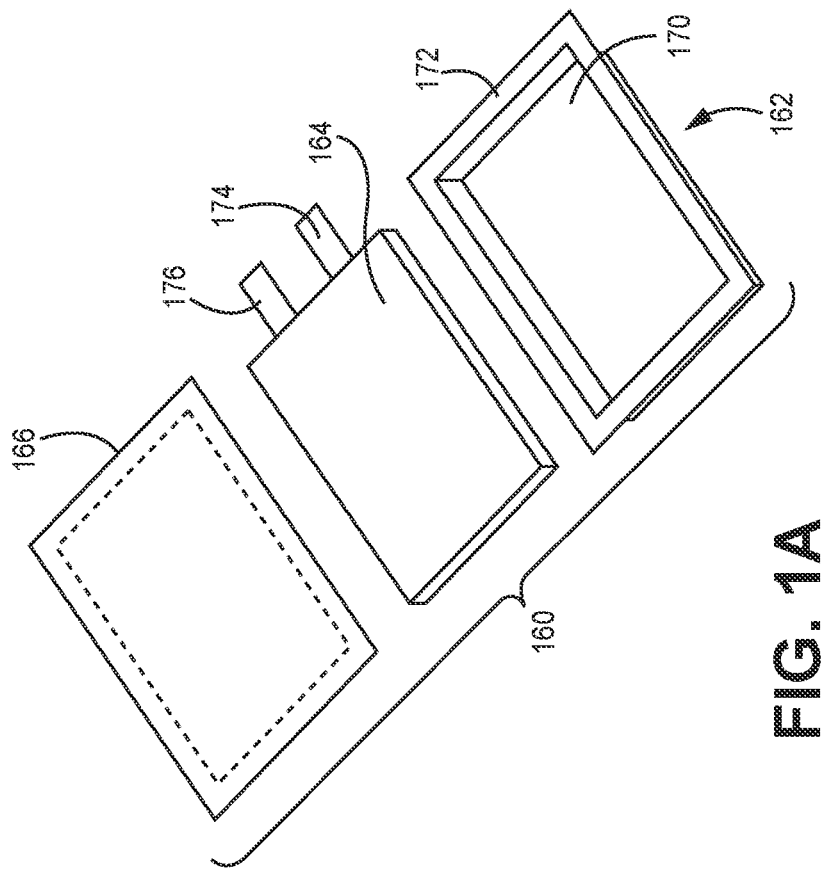
FIG. 1A is an expanded view of a pouch battery with a battery core separated from two portions of the pouch case.

Desirable electrolytes are described herein incorporating cathode stabilizing additives that are combined with other desirable electrolyte formulations to provide improved cycling performance of high voltage for high capacity lithium batteries. In particular, the stabilizing additives of interest are selected to improve the stability of the positive electrode active materials. Based on the formulation of a reference electrolyte composition, the electrolytes can have good high voltage stability and excellent low temperature functionality while supporting good room temperature and high temperature specific capacities and high rate battery performance. The improved electrolytes are also stable for long cycle numbers, which is important for use with the high capacity lithium rich positive electrode active materials that have exceptional cycling properties at high capacity. In some embodiments, the electrolytes comprise a carbonate based solvent system generally having a plurality of carbonate compounds.

Reference electrolytes generally additionally comprise $LiPF_6$, $LiBF_4$ or combinations thereof as a primary lithium salt, along with one or more lithium salt stabilizing additives. While the lithium electrolyte salts provide good ionic conductivity over a range of conditions, $LiPF_6$, $LiBF_4$ and the like can establish an equilibrium with $LiF+XF_y$ ($PF_5$, $BF_3$ or the like), and the $XF_y$ compounds can react with any residual water to form HF, hydrofluoric acid. The cathode stabilizing additives are selected to reduce or eliminate deleterious effects of corrosive compounds that can form in the electrolyte, in particular HF, that can etch the positive electrode active material. Specifically, complexing scavengers and/or LiF can be incorporated to reduce HF concentrations in the electrolyte, and thiophene based additives can be included to form a protective organic polymer coatings over the cathode active materials. The cathode stabilizing additives are discovered to effectively further enhance cycling stability of the cathode material even when the cathode materials already have an inorganic stabilization coating. In particular, electrolytes incorporating the selection of appropriate cathode stabilizing additives in conjunction with the selection of appropriate solvent systems can synergistically operate to increase battery cycling performance of lithium ion batteries incorporating lithium rich metal oxides with inorganic stabilizing coatings. As used herein as well as generally used in the battery arts, the term electrolyte refers to a salt solution while the solid salts dissolved in the solution are referred to as electrolyte salts.

In some embodiments, it is desirable for the batteries to have a long cycle life where the end of life is indicated by the particular drop in capacity below a selected threshold. For consumer electronics, some products have a desired cycle life of at least 300 cycles with acceptable capacity and power output. For electric power vehicles, hybrids and the like, the batteries represent a large cost for the vehicle, and a long cycle life, e.g., at least a thousand cycles, can be desired for the vehicle to be commercially suitable for large scale distribution. Use of the electrolytes described herein can improve the cycling performance of high voltage batteries so that their relatively high capacity can be exploited for a range of applications. Additionally, the electrolytes are suitable for commercial scale use.

Lithium has been used in both primary and secondary batteries. An attractive feature of lithium metal for battery use is its light weight and the fact that it is the most electropositive metal, and aspects of these features can be advantageously captured in lithium-based batteries also. Certain forms of metals, metal oxides, and carbon materials are known to incorporate lithium ions into the material through intercalation, alloying or similar mechanisms. Lithium ion batteries generally refer to batteries in which the negative electrode active material is also a lithium intercalation/alloying material. If lithium metal itself is used as the anode, the resulting battery generally is referred to as a lithium battery. Lithium based batteries can be, for example, lithium batteries or lithium ion batteries. Desirable lithium rich mixed metal oxides are described further herein to function as electroactive materials for positive electrodes in secondary lithium ion batteries, although the desirable electrolytes described herein can be effectively used with other positive electrode active materials.

The batteries described herein are lithium-based batteries in which a non-aqueous electrolyte solution comprises lithium ions. For secondary lithium ion batteries during charge, oxidation takes place in the cathode (positive electrode) where lithium ions are extracted and electrons are released. During discharge, reduction takes place in the cathode where lithium ions are inserted and electrons are consumed. Similarly, the anode (negative electrode) undergoes the opposite reactions from the cathode to maintain charge neutrality. Unless indicated otherwise, performance values referenced herein are at room temperature, i.e., 23±2° C.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form, i.e. elemental metal or a corresponding alloy of the metal's elemental form, i.e. metal alloy. In other words, a metal oxide or other metal composition, other than metal alloys, generally is not metallic.

When lithium based batteries are in use, the uptake and release of lithium from the positive electrode and the negative electrode induces changes in the structure of the electroactive material. As long as these changes are essentially reversible, the capacity of the material does not change. However, the capacity of the active materials is observed to decrease with cycling to varying degrees. Thus, after a number of cycles, the performance of the battery falls below acceptable values, and the battery is replaced. The degradation of performance with cycling can have contributions from the positive electrode, the negative electrode, the electrolyte, the separator or combinations thereof. It is desirable to increase the number of cycles generally available from the batteries prior to the capacity dropping below acceptable performance prompting replacement.

Specifically, contributions to the loss of battery capacity with the cycling of the battery can be attributed to irreversible changes to the positive electrode active materials, which can be measured in various ways. For examples, changes in the positive electrode active materials can be evaluated through, for example, measurements of transition metal extraction, changes in electrochemistry, and through microscopic viewing of the materials removed from the battery. It is believed that at least some of the instability of the positive electrode active material can be associated with reactions involving the electrolyte. Several different parameters related to the battery can be adjusted to improve the cycling performance of high voltage secondary batteries. For example, the selection of the active materials influences the cycling properties of the batteries. The lithium rich metal oxide compositions described herein can be used for the positive electrode active materials, and elemental carbon, e.g., graphitic carbon, can be used for the negative electrode active materials.

Appropriate selection of the electrolyte with respect to solvent and primary lithium salt can improve the cycling performance of the high voltage batteries. In particular, a good selection of the solvent and lithium salt can contribute to the formation of a stable solid electrolyte interface (SEI) layer associated with the negative electrode active materials. For high voltage operation, it is desirable that the electrolyte solvents are not oxidized at higher voltage to any significant degree. Furthermore, additives can be effective to further stabilize the battery performance during cycling.

Additives generally can be classified either as lithium salts or as organic additives, although the lithium salts can have an organic anion. However, it can be useful to alternatively or additionally reference additives in terms of believed function, although we do not want to be limited by theory. In the improved electrolytes described herein, additives can be included that stabilize the cathode active material. Additional or alternative electrolytes can be included that stabilize the negative electrode active materials or provide other stabilizing functions.

Based on the contributions of the lithium ion, the lithium salt additives can provide lithium ions similarly as the primary lithium salt of the electrolyte. Similarly, some organic stabilizing additives can have properties corresponding to solvent compounds. However, to obtain electrolytes with desirable properties with respect to overall performance parameters, it has been found that good battery performance is obtained through the selection of the primary solvents and electrolyte salt to provide good baseline performance and to add selected stabilizing additives at relatively low amounts. Some lithium salt additives for anode stabilization can contribute additional lithium for ionic conductivity, while other anode stabilizing agents can be used as solvent components. Similarly, LiF additive for the stabilization of the positive electrode with cycling can be used as a lithium salt, but as described herein, it is used as a lower concentration additive. Other cathode stabilizing additives described herein are organic compounds that are not generally described as solvent components.

With respect to positive electrode composition, some positive electrode active materials, including lithium rich metal oxides described herein, can be cycled with high capacity for a large number of cycles. Thus, it is desirable for the electrolyte used in corresponding batteries to be stable for a large number of cycles so that the electrolyte is not an important contributing factor to battery failure. Higher specific capacities can be accessed for some embodiments of cathode materials when higher voltages are used. In some embodiments, the positive electrode active materials are lithium rich relative to a $LiMO_2$ reference material, which can have high capacities. To access the higher capacities of the materials, it is desirable to charge the batteries to relatively high voltage, e.g., above 4.4V, and for these embodiments it is desirable for the electrolyte to be stable chemically at the high voltage. In some embodiments, it may be desirable for the electrolyte to be stable to 4.5V or higher, and in other embodiments 4.6V or higher. A person of ordinary skill in the art will recognize that additional ranges of voltage cut offs within the explicit ranges above are contemplated and are within the present disclosure. The details of positive electrode active material used with the electrolytes described herein to construct corresponding high energy batteries are discussed further below.

It is useful to note that during charge/discharge measurements, the specific capacity of a material depends on the rate of discharge. The highest specific capacity of a particular material is measured at very slow discharge rates. In actual use, the actual specific capacity is less than the maximum value due to discharge at a faster rate. More realistic specific capacities can be measured using reasonable rates of discharge that are more similar to the rates encountered during actual use. For example, in low to moderate rate applications, a reasonable testing rate involves a discharge of the battery over three hours. In conventional notation this is written as C/3 or 0.33C. Faster or slower discharge rates can be used as desired, and the rates can be described with the same notation. Performance results at higher rates are described in the Examples below.

With respect to the electrolytes, the batteries described herein generally comprise a non-aqueous solvent, a lithium salt and one or more stabilizing additives. The non-aqueous solvent generally comprises two or more compounds. The solvent compounds generally are miscible. A first solvent component, e.g., ethylene carbonate and/or fluoroethylene carbonate, can be selected, for example, to provide desired levels of solubility of the lithium salts, and these first compounds can be solids at room temperature. In particular, ethylene carbonate and/or fluoroethylene carbonate has been associated with relatively stabile SEI layer formation. A first solvent compounds generally can be more polar and a solid at room temperature or just below, which provides the desired solubility of lithium salts.

A second solvent compound generally is a liquid at room temperature and can provide increased ion mobility. The solvent can comprise one or more room temperature liquid compounds. Specifically, liquid organic solvent compounds can comprise dimethyl carbonate (DMC), methyl ethyl carbonate (MEC), γ-butyrolactone, γ-valerolactone, or a combination thereof. The relative amounts of the solvent compounds can be selected to balance the various properties introduced by the particular solvent components. If the battery is expected to operate over a particular range of temperatures, the solvent selection generally also can be based on appropriate properties over the desired operating temperature range such that appropriate ionic conductivity is maintained over the temperature range. The solvents have also been implicated in the formation of solid electrolyte interphase (SEI) layer, which forms on the first charge of the battery and can contribute to the cycling stability of the battery through the decrease of subsequent reaction, e.g., oxidation of the electrolyte with the active material.

Ethylene carbonate solvent systems have been shown to improve cycling performance of high voltage lithium batteries as further described in U.S. patent application publication number US 2011/0136019 (the '019 application) to Amiruddin et al., entitled "Lithium Ion Battery with High Voltage Electrolytes and Additives," incorporated herein by reference. For low temperature battery operation, ethylene carbonate and/or fluoroethylene carbonate with dimethyl carbonate and optionally with methyl ethyl carbonate have also been shown the to improve low temperature cycling of high voltage lithium batteries as described in U.S. patent application publication number US 2013/0157147 to Li et al., entitled "Low Temperature Electrolyte for High Capacity Lithium Based Batteries," incorporated herein by reference.

The electrolyte can further comprise as a primary lithium salt at least about 1.1M $LiPF_6$, $LiBF_4$ or combinations thereof. In addition to the primary lithium salt component, the electrolyte can comprise a lithium salt stabilizing additive. In the electrolytes herein, the lithium salt stabilizing additive generally is any lithium salt in the electrolyte other than $LiPF_6$ or $LiBF_4$, although certain classes of lithium salt additives are described that can stabilize the cycling of the batteries without significantly deteriorating the performance properties. In some embodiments, the electrolyte comprise from about 0.01 to about 10 weight percent lithium salt additive. Also, non-ion organic stabilizing additives can be included in the electrolyte for further anode stabilization.

High capacity lithium rich metal oxides have the ability to cycle at high specific capacities in high voltage operation. However, the compositions can be prone to instabilities with respect to a drop in capacity associated with manganese dissolution from the material and a drop in average voltage with cycling associate with phase changes. To limit these detrimental changes to the lithium rich compositions, inorganic coatings have been applied to stabilize the compositions. In particular, metal halide and/or metal oxide inert coatings with nanometer scale thicknesses can be effective to stabilize the cycling. It has been found that additional cathode stabilizing compounds can contribute significant further stabilization of the positive electrode active material.

With respect to cathode stabilizing additives, it is believed that lewis base complexing agents, e.g., dimethyl methylphosphonate (DMMP) can help stabilize the positive electrode during cycling by complexing with reactive species in equilibrium with the electrolyte salt anion so that the species are not available to react with residual water to form HF. With respect to thiophene and its derivatives, it is believed that these organic stability additives polymerize on the positive electrode forming a conjugated polymer that results in increased cycle lifetimes. With respect to LiF, the addition of fluoride is believed to shift the equilibriums in the solvent to stabilize the electrolyte salt anion to thereby reduce HF formation. LiF generally is combined with a anion complexing agent to provide appropriate solubilization of the LiF.

The use of DMMP in the electrolytes of half-cell batteries having a positive electrode comprising $LiNi_{0.5}Mn_{1.5}O_4$ and lithium foil negative electrode is describe in Xu et al., *J. Electrochem. Soc.*, 159, A2130 (2012) ("Xu"). Xu does not teach the use of DMMP with similar lithium rich metal oxides, and other significant electrolyte composition differences were present. The use of TP in full cell batteries having a positive electrode comprising a $LiNi_{1/3}Co_{1/3}Mn_{1/3}O_2$ positive electrode active material and a carbon based anode is described in Lee et al., *J. Power Sources*, 196, 6997 (2011) ("Lee") and the use of 3-hexylthiophene (HTP) in half cell batteries having a positive electrode comprising a $Li_{1.2}Ni_{0.15}Co_{0.1}Mn_{0.55}O_2$ or $LiNi_{0.15}Mn_{1.5}O_4$ positive electrode active material and a lithium anode is described in Abouimrane et al., *J. Electrochem. Soc.*, 160, A268 (2013). With respect to Lee and Abouimrane, the improved electrolytes described herein comprise different solvent systems and/or are adapted for use in batteries comprising lithium rich positive electrodes with or without further inorganic stabilization coatings. The improved electrolytes described herein are specifically adapted to provide synergistic improvements in battery cycling performance of the high voltage batteries described herein in conjunction with the selection and adaptation of other electrolyte components including the solvent composition/concentration and the lithium salt/concentration.

Battery Structure

A battery generally comprises one or more positive electrodes and one or more negative electrodes that can be stacked with a separator between them, resulting in a stacked structure. In some embodiments, the stacked structure can be placed into a cylindrical or prismatic configuration. Appropriate electrically conductive tabs can be welded or the like to the current collectors, and the resulting jellyroll or stack structure can be placed into a metal canister or polymer package, with the negative tab and positive tab welded to appropriate external contacts. Electrolyte is added to the housing, and the housing is sealed to complete the battery.

Figure 1B:
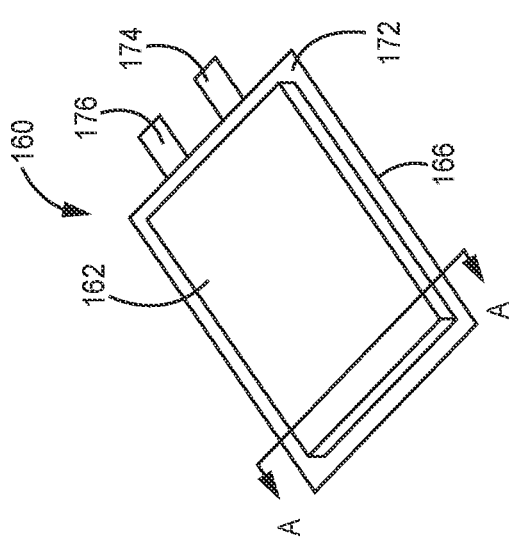
FIG. 1B is a perspective lower face view of the assembled pouch battery of FIG. 1A.
Figure 1C:
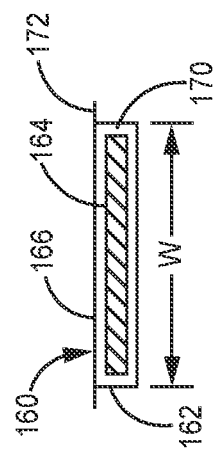
FIG. 1C is a bottom plan view of the pouch battery of FIG. 1B.

In some embodiments, a battery can be formed as a pouch cell. A representative embodiment of a pouch battery is shown in FIGS. 1A to 1D. In this embodiment, pouch battery 160 comprises pouch enclosure 162, battery core 164 and pouch cover 166. A battery core is discussed further below. Pouch enclosure 162 comprises a cavity 170 and edge 172 surrounding the cavity. Cavity 170 has dimensions such that battery core 164 can fit within cavity 170. Pouch cover 166 can be sealed around edge 172 to seal battery core 164 within the sealed battery, as shown in FIGS. 1B and 1C. Terminal tabs 174, 176 extend outward from the sealed pouch for electrical contact with battery core 164. FIG. 1C is a schematic diagram of a cross section of the battery of FIG. 1B viewed along the A-A line. Many additional embodiments of pouch batteries are possible with different configurations of the edges and seals.

Figure 1D:
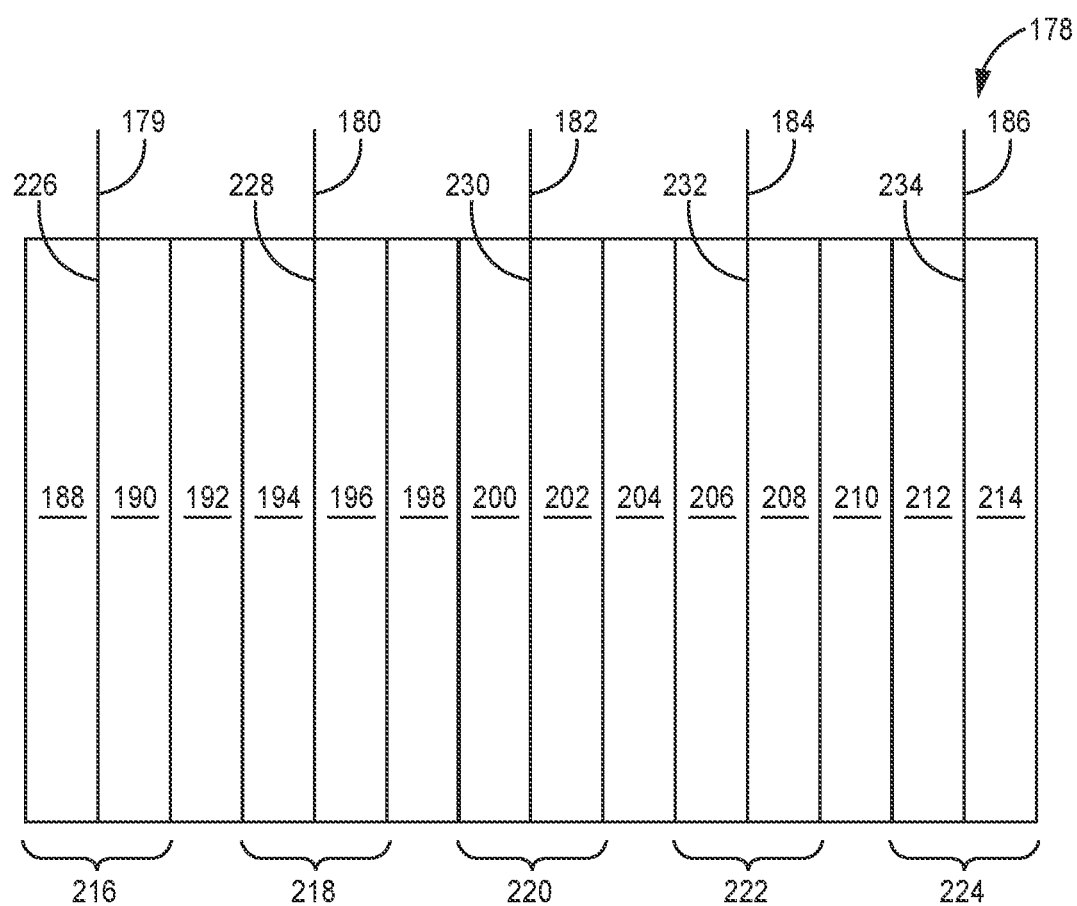
FIG. 1D is depiction of an embodiment of a battery core comprising an electrode stack.
Figure 2:
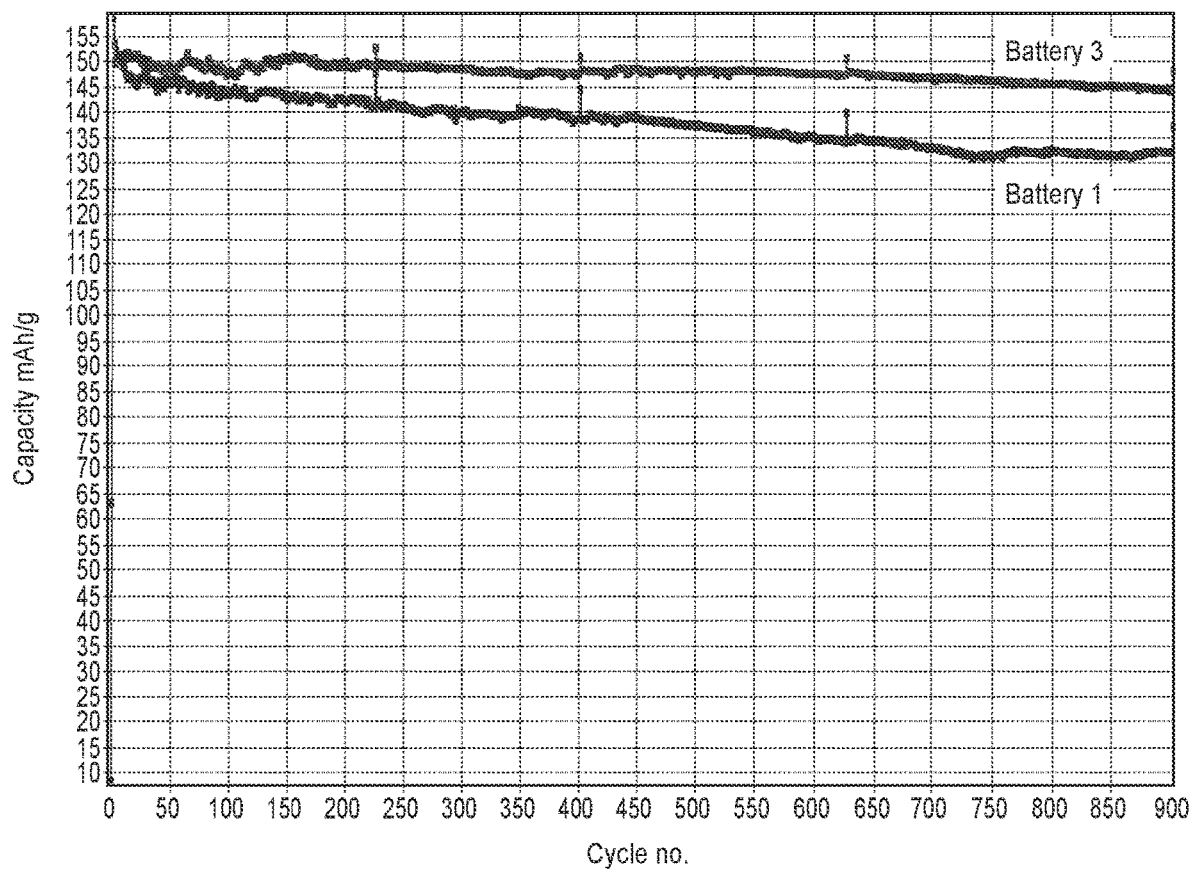
FIG. 2 is a graph showing a plot of discharge capacity vs. cycle number for batteries comprising electrolytes with and without DMMP.
Figure 3:
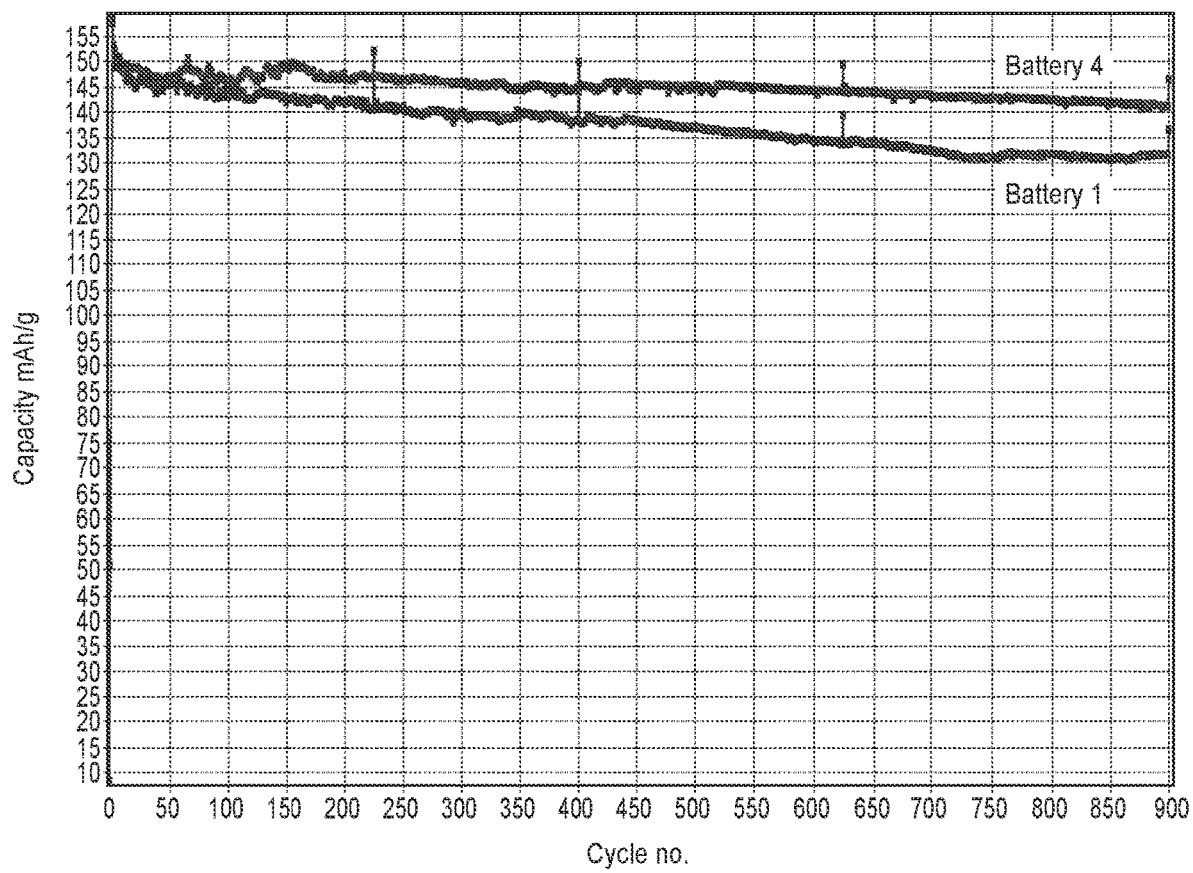
FIG. 3 is a graph showing a plot of discharge capacity vs. cycle number for batteries comprising electrolytes with and without TP.
Figure 4:
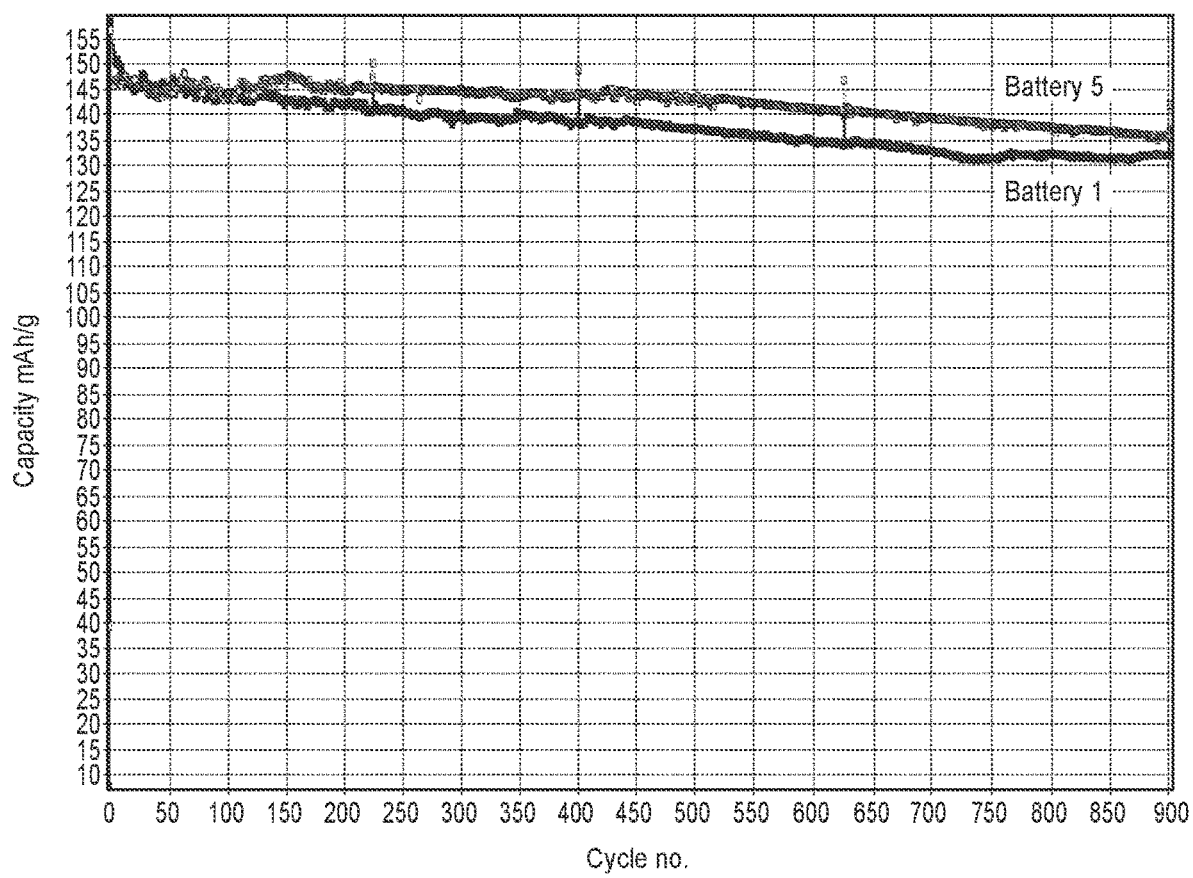
FIG. 4 is a graph showing a plot a discharge capacity vs. cycle number for batteries comprising electrolytes with and without HTP.
Figure 5:
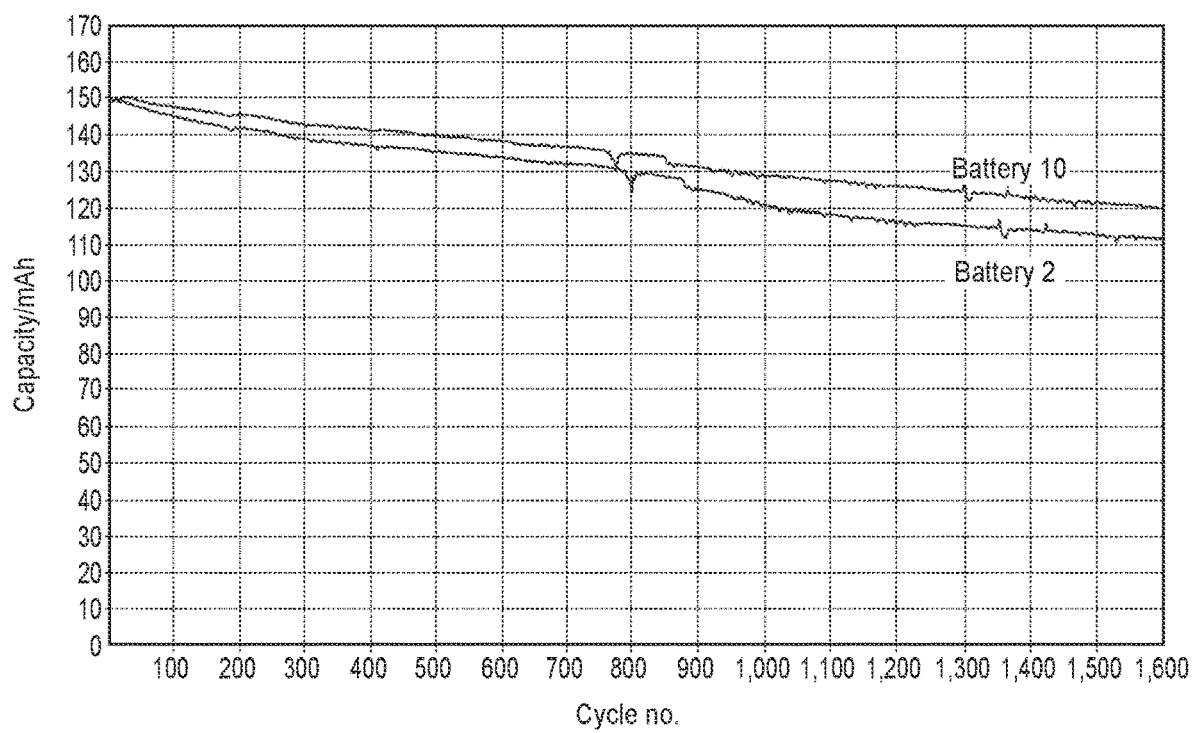
FIG. 5 is a graph showing a plot of a discharge capacity vs. cycle number for batteries comprising electrolytes with and without LiF and tris(pentafluorophenyl)borane.

FIG. 1D shows an embodiment of a battery core 164 that generally comprise an electrode stack. In this embodiment, electrode stack 178 comprises negative electrode structures 216, 220, 224, positive electrode structures 218, 222, and separators 192, 198, 204, 210 disposed between the adjacent positive and negative electrodes. Negative electrode structures 216, 220, 224 comprise negative electrodes 188, 190, negative electrodes 200, 202 and negative electrodes 212, 214, respectively, disposed on either side of current collectors 226, 230, 234. Positive electrode structures 218, 222 comprise positive electrodes 194, 196 and positive electrodes 206, 208, respectively, disposed on opposite sides of current collectors 228, 232, respectively. Tabs 179, 180, 182, 184, 186 are connected to current collectors 226, 228, 230, 232, 234, respectively, to facilitate the connection of the individual electrodes in series or in parallel. For vehicle applications, tabs are generally connected in parallel, so that tabs 179, 182, 186 would be electrically connected to an electrical contact accessible outside the container, and tabs 180, 184 would be electrically connected to an electrical contact as an opposite pole accessible outside the container. While FIG. 1D shows a particular number of electrodes for illustration purposes, a battery can be constructed with more or less numbers of electrodes as desired.

The nature of the negative electrode intercalation material influences the resulting voltage of the battery since the voltage is the difference between the half cell potentials at the cathode and anode. Suitable negative electrode lithium intercalation compositions can include, for example, graphite, synthetic graphite, other forms of graphitic carbon, coke, fullerenes, niobium pentoxide, tin alloys, silicon based material, titanium oxide, tin oxide, and lithium titanium oxide, such as $Li_xTiO_2$, $0.5<x\leq1$ or $Li_{1+x}Ti_{2-x}O_4$, $0\leq x\leq 1/3$. Additional negative electrode materials are described in published U.S. Patent Application No. 2010/0119942 to Kumar, entitled "Composite Compositions, Negative Electrodes with Composite Compositions and Corresponding Batteries," and U.S. Pat. No. 8,277,974 to Kumar et al., entitled "Lithium Ion Batteries with Particular Negative Electrode Compositions," both of which are incorporated herein by reference.

In some embodiments, the negative electrodes can generally comprise elemental carbon materials, e.g., graphite, synthetic graphite, coke, fullerenes, carbon nanotubes, other graphitic carbon and combinations thereof, which are expected to be able to achieve the long term cycling at higher voltages. Graphitic carbon has a low potential so that a resulting battery can operate at a high voltage, e.g., greater than 4.2V, if the cathode active material has a suitable high voltage against lithium metal. Thus, for long cycling applications, high energy density batteries can have negative electrodes with an active elemental carbon material. Graphitic carbon generally comprises graphene sheets of $sp^2$ bonded carbon atoms. For convenience, as used herein graphitic carbon refers to any elemental carbon material comprising substantial domains of graphene sheets.

High capacity negative electrode active materials can comprise silicon based material such as elemental silicon and/or silicon oxide ($SiO_x$, $x<2$). In general, these materials exhibit large volume changes during cycling. Recent advances have improved the cycling properties of these high capacity materials, and batteries have been formed that combine high capacity positive electrode active materials and high capacity negative electrode active materials with reasonable cycling behavior. Silicon materials with improved cycling properties is described further in published U.S. Patent Application No. 2011/0111294 to Lopez et al. (the '294 Application), entitled "High Capacity Anode Materials for Lithium Ion Batteries," incorporated herein by reference. High capacity anode materials with improved cycling based on oxygen deficient silicon oxide is described further in published U.S. patent application number 2012/0295155 to Deng et al. (the '155 Application), entitled "Silicon Oxide Based High Capacity Anode Materials For Lithium Ion Batteries," incorporated herein by reference.

For lithium battery, the negative electrode can be, for example, lithium foil, lithium metal powder, lithium metal alloy, or a combination thereof. Commercially available lithium foil can be used directly as negative electrode. While lithium metal such as commercially available stabilized lithium powder can be used with a polymer binder to form the negative electrode, and the discussion herein for the formation of electrodes from other negative electrode powders can be generally applicable to the lithium metal powder. Lithium metal alloys such as lithium aluminum alloy (<4 wt % Al) and lithium magnesium alloy can also be used as negative electrode active material for lithium battery. Lithium aluminum alloy and lithium magnesium alloy in foil format in particular are commercially available.

The positive electrode active compositions and negative electrode active compositions generally are powder compositions that are held together in the respective electrode with a polymer binder. The binder provides ionic conductivity to the active particles when in contact with the electrolyte. Suitable polymer binders include, for example, polyvinylidene fluoride (PVDF), polyethylene oxide, polyimide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof.

The active particle loading in the binder can be large, such as greater than about 80 weight percent, in further embodiments at least about 83 weight percent and in other embodiments from about 85 to about 97 weight percent active material. A person of ordinary skill in the art will recognize that additional ranges of particles loadings within the explicit ranges above are contemplated and are within the present disclosure. To form the electrode, the powders can be blended with the polymer binder in a suitable liquid, such as a solvent for the polymer binder. The resulting paste can be pressed into the electrode structure.

The positive electrode composition, and in some embodiments the negative electrode composition generally can also comprise an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, an electrode can comprise from about 1 weight percent to about 25 weight percent, and in further embodiments from about 2 weight percent to about 20 weight percent and in other embodiments from about 3 weight percent to about 15 weight percent distinct electrically conductive powder. A person of ordinary skill in the art will recognize that additional ranges of amounts of electrically conductive powders within the explicit ranges above are contemplated and are within the present disclosure.

Each electrode generally is associated with an electrically conductive current collector to facilitate the flow of electrons between the electrode and an exterior circuit. A current collector can comprise a metal structure, such as a metal foil or a metal grid. In some embodiments, a current collector can be formed from nickel, aluminum, stainless steel, copper or the like. An electrode material can be cast as a thin film onto a current collector. The electrode material with the current collector can then be dried, for example in an oven, to remove solvent from the electrode. In some embodiments, a dried electrode material in contact with a current collector foil or other structure can be subjected to a pressure from about 2 to about 10 kg/cm² (kilograms per square centimeter).

The separator is located between the positive electrode and the negative electrode. The separator is electrically insulating while providing for at least selected ion conduction between the two electrodes. A variety of materials can be used as separators. Commercial separator materials can be formed from polymers, such as polyethylene and/or polypropylene that are porous sheets that provide for ionic conduction. Also, ceramic-polymer composite materials have been developed for separator applications. These composite separators can be stable at higher temperatures, and the composite materials can significantly reduce the fire risk. Polymer-ceramic composites for lithium ion battery separators are sold under the trademark Separion® by Evonik Industries, Germany.

Also, on the first cycle of the battery, generally there is an irreversible capacity loss that is significantly greater than per cycle capacity loss at subsequent cycles. The irreversible capacity loss is the difference between the first charge capacity of the new battery and the first discharge capacity. For lithium rich positive electrode active materials with graphitic carbon electrodes, a significant portion of the first cycle irreversible capacity loss can be generally attributed to the positive electrode active material. However, at least some of the irreversible capacity loss can be further attributed to the formation of a solid electrolyte interphase layer associated with the electrodes, and in particular with the negative electrode. The stable long term cycling of the batteries formed with the electrolytes described herein suggests that the electrolytes are suitable for the formation of stable solid electrolyte interphase layers.

The electrolytes described herein can be incorporated into various commercial battery designs such as prismatic shaped batteries, wound cylindrical batteries, coin cell batteries, or other reasonable battery shapes. The batteries can comprise a single pair of electrodes or a plurality of pairs of electrodes assembled in parallel and/or series electrical connection(s). While the electrolytes described herein can be used in batteries for primary or single charge use, the resulting batteries generally have desirable cycling properties for secondary battery use over multiple cycling of the batteries.

In some embodiments, the positive electrode and negative electrode can be stacked with the separator between them, and the resulting stacked structure can be rolled into a cylindrical or prismatic configuration to form the battery structure. Appropriate electrically conductive tabs can be welded or the like to the current collectors and the resulting jellyroll structure can be placed into a metal canister or polymer package, with the negative tab and positive tab welded to appropriate external contacts. Electrolyte is added to the canister, and the canister is sealed to complete the battery.

Pouch cell batteries can be particularly desirable for vehicle applications due to stacking convenience and relatively low container weight. A desirable pouch battery design for vehicle batteries incorporating a high capacity cathode active materials is described in detail in published U.S. patent application 2012/0028105 to Kumar et al., entitled "Battery Packs for Vehicles and High Capacity Pouch Secondary Batteries for Incorporation into Compact Battery Packs," incorporated herein by reference. While the pouch battery designs are particularly convenient for use in specific battery pack designs, the pouch batteries can be used effectively in other contexts as well with high capacity in a convenient format.

High Voltage Positive Electrode Active Materials

The stabilization properties of the electrolytes described herein should provide desirable cycling properties that can be appropriate for any reasonable lithium ion chemistry. However, the electrolytes particularly provide high voltage stability, so that the electrolytes can be effectively used with high voltage active materials, such as voltages greater than about 4.4 volts and in further embodiments greater than about 4.45V. The battery potentials depend on the half cell potentials of both the anode and the cathode, but higher capacity anode active materials can have a low voltage against lithium for at least a portion of a full discharge cycle.

In general, positive electrode (cathode) active materials of interest comprise a lithium intercalation material such as lithium metal oxides or lithium metal phosphates. Positive electrode active materials include, for example, as stoichiometric layered cathode materials with hexagonal lattice settings like $LiCoO_2$, $LiNiO_2$, $LiCo_{1/3}Mn_{1/3}Ni_{1/3}O_2$ or the like; cubic spinel cathode materials such as $LiMn_2O_4$, $Li_4Mn_5O_{12}$, or the like; olivine materials, such as $LiMPO_4$ (M=Fe, Co, Mn, combinations thereof and the like). Lithium rich positive electrode active materials are of interest due to their high capacity, such as layered cathode materials, e.g., $Li_{1+x}(NiCoMn)_{0.33-x}O_2$ (0≤x<0.3) systems; layer-layer composites, e.g., $xLi_2MnO_3·(1-x)LiMO_2$ where M can be Ni, Co, Mn, combinations thereof and the like; and composite structures like layered-spinel structures such as $LiMn_2O_4$. $LiMO_2$. In some embodiments, a lithium rich composition can be referenced relative to a composition $LiMO_2$, where M is one or more metals with an average oxidation state of +3.

Generally, the lithium rich compositions can be represented approximately with a formula $Li_{1+x}M_{1-y}O_2$, where M represents one or more non-lithium metals and y is related to x based on the average valance of the metals. In some layered-layered composite compositions, x is approximately equal to y. The additional lithium in the initial cathode material can provide to some degree corresponding additional active lithium for cycling that can increase the battery capacity for a given weight of cathode active material. In some embodiments, the additional lithium is accessed at higher voltages such that the initial charge takes place at a higher voltage to access the additional capacity.

Lithium rich positive electrode active materials of particular interest are represented approximately by a formula

   Formula I where b ranges from about 0.01 to about 0.3, α ranges from about 0 to about 0.4, β ranges from about 0.2 to about 0.65, γ ranges from 0 to about 0.46, δ ranges from 0 to about 0.15 and z ranges from 0 to about 0.2 with the proviso that both α and γ are not zero, and where A is a metal element different from Ni, Mn, Co, or a combination thereof. Element A and F (fluorine) are optional cation and anion dopants, respectively. Element A can be, for example Mg, Sr, Ba, Cd, Zn, Al, Ga, B, Zr, Ti, Ca, Ce, Y, Nb, Cr, Fe, V, Li or combinations thereof. A person of ordinary skill in the art will recognize that additional ranges of parameter values within the explicit compositional ranges above are contemplated and are within the present disclosure.

To simplify the following discussion in this section, the optional dopants are not discussed further except for under the context of the following referenced applications. The use of a fluorine dopant in lithium rich metal oxides to achieve improved performance is describe in published U.S. Patent Application No. 2010/0086854 to Kumar et al., entitled "Fluorine Doped Lithium Rich Metal Oxide Positive Electrode Battery Materials With High Specific Capacity and Corresponding Batteries," incorporated herein by reference. Compositions in which A is lithium as a dopant for substitution for Mn are described in U.S. Pat. No. 8,475,959 to Venkatachalam et al., entitled "Lithium Doped Cathode Material," incorporated herein by reference. The specific performance properties obtained with +2 metal cation dopants, such as $Mg^{+2}$, are described in published U.S. Patent Application No. 2011/0244331 to Karthikeyan et al., entitled "Doped Positive Electrode Active Materials and Lithium Ion Secondary Batteries Constructed Therefrom," incorporated herein by reference.

The formulas presented herein for the positive electrode active materials are based on the molar quantities of starting materials in the synthesis, which can be accurately determined. With respect to the multiple metal cations, these are generally believed to be quantitatively incorporated into the final material with no known significant pathway resulting in the loss of the metals from the product compositions. Of course, many of the metals have multiple oxidation states, which are related to their activity with respect to the batteries. Due to the presence of the multiple oxidation states and multiple metals, the precise stoichiometry with respect to oxygen generally is only roughly estimated based on the crystal structure, electrochemical performance and proportions of reactant metals, as is conventional in the art. However, based on the crystal structure, the overall stoichiometry with respect to the oxygen is reasonably estimated. All of the protocols discussed in this paragraph and related issues herein are routine in the art and are the long established approaches with respect to these issues in the field.

The stoichiometric selection for the compositions can be based on some presumed relationships of the oxidation states of the metal ions in the composition. As an initial matter, if in Formula I above, $b+\alpha+\beta+\gamma+\delta$ is approximately equal to 1, then the composition can be correspondingly approximately represented by a two component notation as:

$x\text{Li}_2\text{M'O}_3 \cdot (1-x)\text{LiMO}_2$      Formula II where 0<x<1, M is one or more metal cations with an average valance of +3 with at least one cation being a Mn ion or a Ni ion and where M' is one or more metal cations with an average valance of +4. It is believed that the layer-layer composite crystal structure has a structure with the excess lithium supporting the formation of an alternative crystalline phase. For example, in some embodiments of lithium rich materials, a $\text{Li}_2\text{MnO}_3$ material may be structurally integrated with either a layered $\text{LiMO}_2$ component where M represents selected non-lithium metal elements or combinations thereof. These compositions are described generally, for example, in U.S. Pat. No. 6,680,143 to Thackeray et al., entitled "Lithium Metal Oxide Electrodes for Lithium Cells and Batteries," which is incorporated herein by reference.

Recently, it has been found that the performance properties of the positive electrode active materials can be engineered around the specific design of the composition stoichiometry. The positive electrode active materials of particular interest can be represented approximately in two component notation as:

$x\text{Li}_2\text{MnO}_3 \cdot (1-x)\text{LiMO}_2$      Formula III where M is one or more metal elements with an average valance of +3 and with one of the metal elements being Mn and with another metal element being Ni and/or Co. In general, in Formula II and III above, the x is in the range of 0<x<1, but in some embodiments 0.03≤x≤0.6, in further embodiments 0.075≤x≤0.50, in additional embodiments 0.1≤x≤0.45, and in other embodiments 0.15≤x≤0.425. A person of ordinary skill in the art will recognize that additional ranges within the explicit ranges of parameter x above are contemplated and are within the present disclosure.

In some embodiments, M in Formula III comprises manganese, nickel, cobalt or a combination thereof along with an optional dopant metal and can be written as $\text{Ni}_u\text{Mn}_v\text{Co}_w\text{A}_y$, where A is a metal other than Ni, Mn or Co. Consequently Formula III now becomes:

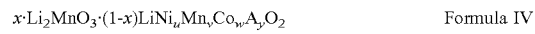

$x \cdot \text{Li}_2\text{MnO}_3 \cdot (1-x)\text{LiNi}_u\text{Mn}_v\text{Co}_w\text{A}_y\text{O}_2$      Formula IV where u+v+w+y≈1. While Mn, Co and Ni have multiple accessible oxidation states, which directly relates to their use in the active material, in these composite materials if appropriate amounts of these elements are present, it is thought that the elements can have the oxidation states $Mn^{+4}$, $Co^{+3}$ and $Ni^{+2}$. In the overall formula, the total amount of manganese has contributions from both constituents listed in the two component notation. Additionally, if δ=0 in Formula I, the two component notation of Formula IV can simplify with v≈u to $x \cdot \text{Li}_2\text{MnO}_3 \cdot (1-x)\text{LiNi}_u\text{Mn}_u\text{Co}_w\text{O}_2$, with 2u+w=1.

In some embodiments, the stoichiometric selection of the metal elements can be based on the above presumed oxidation states. Based on the oxidation state of dopant element A, corresponding modifications of the formula can be made. Also, compositions can be considered in which the composition varies around the stoichiometry with v≈u. The engineering of the composition to obtain desired battery performance properties is described further in U.S. Pat. No. 8,394,534 (the '534 patent) to Lopez et al., entitled "Layer-Layer Lithium Rich Complex Metal Oxides With High Specific Capacity and Excellent Cycling," incorporated herein by reference. Similar compositions have been described in U.S. Pat. No. 8,389,160 (the '160 patent) to Venkatachalam et al. entitled "Positive Electrode Material for Lithium Ion Batteries Having a High Specific Discharge Capacity and Processes for the Synthesis of these Materials", and U.S. Pat. No. 8,465,873 (the '873 patent) to Lopez et al. entitled "Positive Electrode Materials for High Discharge Capacity Lithium Ion Batteries", both incorporated herein by reference.

The positive electrode material can be advantageously synthesized by co-precipitation and sol-gel processes detailed in the '160 patent and the '873 patent. In some embodiments, the positive electrode material is synthesized by precipitating a mixed metal hydroxide or carbonate composition from a solution comprising +2 cations wherein the hydroxide or carbonate composition has a selected composition. The metal hydroxide or carbonate precipitates are then subjected to one or more heat treatments to form a crystalline layered lithium metal oxide composition. A carbonate co-precipitation process described in the '873 patent gave desired lithium rich metal oxide materials having cobalt in the composition and exhibiting the high specific capacity performance with superior tap density. These copending patent applications also describe the effective use of metal fluoride coatings to improve performance and cycling.

Coatings and Formation of Coatings on Positive Electrode Active Materials

In some embodiments, it has been found that an inorganic coating, such as metal halide coatings, metal oxide or metal phosphate coatings, on the lithium rich positive electrode active materials described herein can further improve the cycling performance of lithium ion batteries formed therefrom, although the coatings are believed to be inert with respect to battery cycling. In particular, the cycling properties of the batteries formed from coated lithium rich metal oxides can significantly improve from the uncoated material. Additionally, the specific capacity of the batteries also shows desirable properties with the coatings. These performance improvements can be similarly exploited in conjunction with the improved organic stability additives described herein.

With respect to metal oxide, metal halide coatings or a combination thereof, a coating with a combination of metal and/or metalloid elements can be used for the coating compositions.

Suitable metals and metalloid elements for the fluoride coatings include, for example, Al, Bi, Ga, Ge, In, Mg, Pb, Si, Sn, Ti, Tl, Zn, Zr and combinations thereof. Aluminum fluoride can be a desirable coating material since it has a reasonable cost and is considered environmentally benign. It has been found that metal/metalloid fluoride coatings can significantly improve the performance of lithium rich layered compositions for lithium ion secondary batteries. See, for example, the '160 patent and the '873 patent cited above, as well as published U.S. patent application number 2011/0111298 (the '298 application) to Lopez et al., entitled "Coated Positive Electrode Materials For Lithium Ion Batteries," incorporated herein by reference. Desirable performance results for non-fluoride metal halide coatings have been described in published U.S. patent application 2012/0070725 to Venkatachalam et al., entitled "Metal Halide Coatings on Lithium Ion Battery Positive Electrode Materials and Corresponding Batteries," incorporated herein by reference. This patent application also discusses methods for formation of desired metal halide coatings.

The use of a $LiNiPO_4$ coating to obtain improved cycling performance is described in an article to Kang et al. "Enhancing the rate capability of high capacity $xLi_2MnO_3$ $(1-x)LiMO_2$ (M=Mn, Ni, Co) electrodes by Li—Ni—$PO_4$ treatment," Electrochemistry Communications 11, 748-751 (2009), incorporated herein by reference, and this article can be referenced generally with respect to the formation of metal phosphate coatings. Desirable properties of metal oxide coatings on lithium rich positive electrode active materials are described further in published U.S. patent application 2011/0076556 to Karthikeyan et al., entitled "Metal Oxide Coated Positive electrode Materials for Lithium-Based Batteries," incorporated herein by reference.

In some embodiments, the coating improves the specific capacity of the batteries even though the coating itself is not electrochemically active. However, the coatings also influence other properties of the active material, such as the average voltage, thermal stability and impedance. The selection of the coating properties can incorporate additional factors related to the overall range of properties of the material.

In general, the coatings can have an average thickness of no more than 25 nm, in some embodiments from about 0.5 nm to about 20 nm, in other embodiments from about 1 nm to about 12 nm, in further embodiments from 1.25 nm to about 10 nm and in additional embodiments from about 1.5 nm to about 8 nm. A person of ordinary skill in the art will recognize that additional ranges of coating material within the explicit ranges above are contemplated and are within the present disclosure. The amount of coating materials to achieve desired improvement in battery performance can be related to the particle size and surface area of the uncoated material. Further discussion of the effects of coating thickness on the performance properties for coated lithium rich lithium metal oxides is found in the '298 application cited above.

A metal fluoride coating can be deposited using a solution based precipitation approach. A powder of the positive electrode material can be mixed in a suitable solvent, such as an aqueous solvent. A soluble composition of the desired metal/metalloid can be dissolved in the solvent. Then, $NH_4F$ can be gradually added to the dispersion/solution to precipitate the metal fluoride. The total amount of coating reactants can be selected to form the desired thickness of coating, and the ratio of coating reactants can be based on the stoichiometry of the coating material. The coating mixture can be heated during the coating process to reasonable temperatures, such as in the range from about 60° C. to about 100° C. for aqueous solutions from about 20 minutes to about 48 hours, to facilitate the coating process. After removing the coated electroactive material from the solution, the material can be dried and heated to temperatures generally from about 250° C. to about 600° C. for about 20 minutes to about 48 hours to complete the formation of the coated material. The heating can be performed under a nitrogen atmosphere or other substantially oxygen free atmosphere.

An oxide coating is generally formed through the deposition of a precursor coating onto the powder of active material. The precursor coating is then heated to form the metal oxide coating. Suitable precursor coating can comprise corresponding metal hydroxides, metal carbonates or metal nitrates. The metal hydroxides and metal carbonate precursor coating can be deposited through a precipitation process since the addition of ammonium hydroxide and/or ammonium carbonate can be used to precipitate the corresponding precursor coatings. A metal nitrate precursor coating can be deposited through the mixing of the active cathode powder with a metal nitrate solution and then evaporating the solution to dryness to form the metal nitrate precursor coating. The powder with a precursor coating can be heated to decompose the coating for the formation of the corresponding metal oxide coating. For example, a metal hydroxide or metal carbonate precursor coating can be heated to a temperature from about 300° C. to about 800° C. for generally from about 1 hr to about 20 hrs. Also, a metal nitrate precursor coating generally can be heated to decompose the coating at a temperature from about 250° C. to about 550° C. for at least about 30 minutes. A person of ordinary skill in the art can adjust these processing conditions based on the disclosure herein for a specific precursor coating composition.

Electrolyte

The electrolyte provides for ion transport between the anode and cathode of the battery during the charge and discharge processes. To stabilize high voltage operation, the solvent is selected to provide stability with respect to avoidance of oxidation of the electrolyte as well as an appropriate additive to stabilize the cycling. The electrolytes generally comprise an organic non-aqueous solvent, a primary lithium salt, an optional lithium salt additive and an organic stabilizing additive. Solvent systems are described herein with specific solvent combinations, and organic compounds other than the compositions in the particular solvent combination are considered organic additives for these solvent systems regardless if the organic compounds have solvent like properties. In some embodiments, the electrolytes are stable at high voltages, e.g., above 4.4 V. In additional or alternative embodiments, the electrolytes can support high rates of discharge. The electrolytes in general are stable through a long range of cycle numbers, for example from hundreds to thousands of cycles. The electrolyte can be formulated for reasonable low temperature battery operation.

The solvent of the electrolyte generally comprises a blend of organic compositions. With respect to improved electrolytes described herein the solvents comprise a blend of a higher melting more polar component, such as ethylene carbonate and fluoroethylene carbonate, and a lower melting component, such as dimethyl carbonate, methyl ethyl carbonate, γ-butyrolactone, γ-valerolactone or a combination thereof. As used herein including in the claims, any additional organic compositions in the electrolyte beyond the base explicit carbonate blends are considered organic additives even if they could be characterized in some sense as solvents. Similarly, the primary lithium salt is $LiPF_6$, $LiBF_4$, or combinations thereof. The electrolyte generally also comprises a lithium salt additive. The lithium salt additive further contributes lithium cations to the electrolyte similar to the lithium base salt, but the lithium salt additives are considered as distinct components from the primary lithium salt of the electrolyte. The electrolyte is generally non-aqueous, and water can be considered an undesirable contaminant that can degrade battery active materials. Of course, trace amounts of water may be present, although processing is generally performed to keep the amount of water contamination very low. Some of the cathode stabilizing agents described herein can reduce or eliminate detrimental effects of water contamination.

Additives have been found to be successful at stabilizing the cycling properties of high voltage lithium ion batteries, e.g., batteries with lithium rich positive electrode active compositions described herein. In particular, the cathode stabilization compounds can further improve cycling even when the positive electrode active materials are already coated with an inorganic stabilization coating. Three types of cathode stabilization agents are described, dimethyl methylphosphonate, thiophene and derivatives thereof and LiF with a complexation agent. In addition, one or more additives can be added for stabilization of the anode. In particular, lithium borate salts have been found to significantly stabilize the anode materials with an SEI layer, and other organic additives can also be included to stabilize the anode. As described herein, the selection of electrolyte additives can be combined with the inclusion of electroactive materials with excellent properties with respect to energy density and other capacity parameters as well as cycling to result in remarkable performance properties. In particular, the electrolyte should be stable both with respect to resisting chemical changes as a result of the electrochemical reactions in the cell during activation to improve shelf life of the battery as well as to provide a high capacity. Furthermore, desirable additives can further stabilize the electroactive materials during cycling.

Solvent

Solvent systems are described herein that can provide desirable cycling performance out to a large number of cycles for the high voltage lithium batteries described herein. The solvent system generally is based on a solvent blend comprising or consisting essentially of 1) ethylene carbonate a, fluoroethylene carbonate or a mixture thereof and 2) one or more of a set of liquid solvent compounds. The liquid solvent compounds generally are dimethyl carbonate, methyl ethyl carbonate, γ-butyrolactone, γ-valerolactone or a combination thereof. As used herein, if the electrolyte comprises any carbonate compositions besides the explicit primary solvents of the particular solvent system, these additional compositions are considered organic additives in the electrolyte with the corresponding quantity limits. In some embodiments, a solvent system can consisting essentially of a tertiary blend of ethylene carbonate, dimethyl carbonate, and ethylmethyl carbonate can be desirable to improve battery cycling over a reasonably large temperature range. As used herein, reference to specific compounds is based on reasonable purity as used in the art, and the expression "consisting essentially of" can be used to acknowledge the potential presence of impurities, other compositions or the like in sufficiently small quantities that battery performance is not significantly affected.

The solvent blends are generally a viscous liquid at room temperature. The relative amounts of the solvent components can be selected to balance the various properties introduced by the particular solvent components. In general, the additional components of the electrolyte have particular ranges of their quantities in the electrolyte. Thus, once all of the components are accounted for in the electrolyte, the electrolyte accordingly comprises a significant quantity of the primary solvent blend. Specific solvent blends are described in the following with surprisingly good performance characteristics with respect to low temperature behavior as well as cycling out to large numbers of cycles. In the solvent systems herein, the solvent is generally substantially free of diethyl carbonate (DEC) due to high voltage instability that has been observed for DEC.

In some embodiments, the solvent comprises from about 5 to about 80 volume percent ethylene carbonate and/or fluoroethylene carbonate, in further embodiments from about 10 to about 75 volume percent and in other embodiments from about 15 to about 70 volume percent ethylene carbonate and/or fluoroethylene carbonate. The ethylene carbonate with a melting point of about 39-40° C. is a solid at room temperature, and fluoroethylene carbonate has a melting point of 18-22° C. so it melts around room temperature. The other solvent components that are liquids at room temperature can be included in the solvent blend to form a solvent blend that is a liquid at room temperature. The relative amounts of the solvent components can be selected to provide desired ion conductivity over the desired operating temperatures of the battery. A person of ordinary skill in the art will recognize that additional ranges of solvent composition within the explicit ranges above are contemplated and are within the present disclosure.

In some embodiment of solvent systems with a blend of carbonate solvents, the solvent can comprises a weight ratio of ethylene carbonate to dimethyl carbonate from about 1:1 to about 1:4, in further embodiments from about 1:1.25 to about 1:3, in additional embodiments from about 1:1.5 to about 1:2.5, and in other embodiments from about 1:1.75 to about 1:2.25. A person of ordinary skill in the art will recognize that additional ranges of values within the explicit ratio ranges above are contemplated and are within the present disclosure.

A quantity of the ethyl methyl carbonate can be expressed as the weight percent of the total electrolyte weight. In other words, the weight percent of ethyl methyl carbonate is equal to $[100 \times W_{EMC}/(W_{EC}+W_{DMC}+W_{EMC}+W_{primary\ lithium\ salt}+W_{lithium\ salt\ additive}+W_{other})]$, where $W_{EC}$ is the weight of ethylene carbonate, $W_{DMC}$ is the weight of dimethyl carbonate, $W_{EMC}$ is the weight of ethylmethyl carbonate, $W_{primary\ lithium\ salt}$ is the total weight of the primary lithium salt, $W_{lithium\ salt\ additive}$ is the total weight of the lithium salt additives, and $W_{other}$ is the weight of optional organic additives in the electrolyte. In particular, the electrolyte comprises a weight percent of ethylmethyl carbonate from about 5 weight percent to about 40 weight percent, in further embodiments from about 8 weight percent to about 37.5 weight percent, in additional embodiments from about 10 weight percent to about 35 weight percent, and in other embodiments from about 15 weight percent to about 32 weight percent. A person of ordinary skill in the art will recognize that additional ranges of values within the explicit weight percent ranges above are contemplated and are within the present disclosure.

The solvents have been implicated in the formation of solid electrolyte interphase (SEI) layer, which forms on the first charge of the battery and can contribute to the cycling stability of the battery through the decrease of subsequent reaction of the electrolyte, e.g., oxidation of the electrolyte. In particular, ethylene carbonate and/or fluoroethylene carbonate can be desirable for relatively stabile SEI layer formation. As noted herein, the solvents described herein provide for excellent cycling properties, which implies that a stable SEI layer is formed. For high voltage operation, another significant aspect of the electrolyte properties is the oxidative stability. The oxidative stability can depend on both the solvent and the lithium salt. Suitable combinations of solvent and lithium salts can be used for high voltage operation, i.e., voltages above 4.45 volts. The improved oxidative stability is shown to improve cycling performance of the corresponding batteries.

Lithium Salt (Primary Lithium Salt Plus Lithium Additive Salt)

The primary lithium salt provides lithium ions to support battery cycling. The selection of the particular primary lithium salt can be based on appropriate solubility, ion mobility and stability. The lithium salt dissolves into the non-aqueous solvents specified herein. The particular electrolyte salt(s) and their concentration in the electrolyte can influence the oxidative stability of the resulting electrolyte. Some anode stabilizing additives generally can be also lithium salts such that lithium ions in the electrolyte can be contributed by both the primary lithium salt and the lithium salt additive. The primary lithium salt generally is the principal source of lithium ions.

The primary lithium salt in general comprises $LiPF_6$, $LiBF_4$ or combinations thereof. In some embodiments, the electrolytes described herein comprises from about 1.05M to about 2.0M primary lithium salt and one or more lithium salt additives in a total amount from about 0.01 weight percent to about 10 weight percent of the total weight of the electrolyte. In additional or alternative embodiments, the concentration of the primary lithium salt in the electrolyte is from about 1.05M to about 1.9M, in further embodiments from about 1.05M to about 1.8M, in additional embodiments from about 1.1M to about 1.75M, and in other embodiments from about 1.15M to about 1.6M. With respect to the lithium salt additives, the electrolyte can comprise in some embodiments from about 0.05 weight percent to about 9 weight percent, in other embodiments from about 0.1 weight percent to about 8 weight percent and in further embodiments from about 0.25 weight percent to about 7.5 weight percent of the total electrolyte weight. A person of ordinary skill in the art will recognize that additional ranges of values within the explicit salt concentration ranges above are contemplated and are within the present disclosure.

A class of alternative electrolyte salts suitable for use as electrolyte salt additives as described herein is described in U.S. Pat. No. 6,783,896 to Tsujioka et al. ("the '896 patent"), entitled "Electrolyte for Electrochemical Device," incorporated herein by reference. In particular, the alternative electrolytes in the '896 patent are ionic complexes formed as lithium salts for the formation of a lithium-based electrolyte with a formula representation as follows:

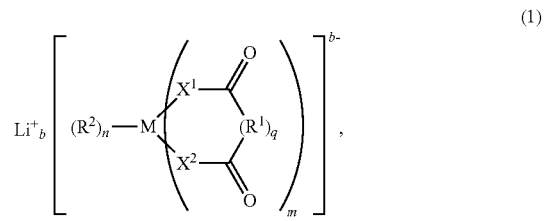

where b is a number from 1 to 3, m is a number from 1 to 4, n is a number from 1 to 8, q is 0 or 1, M can be a transition metal or an element from groups 13, 14 or 15 of the periodic table, in particular aluminum, boron, phosphorous, arsenic, antimony or silicon, $R^1$ is optional and can be an organic group, $R^2$ is a halogen atom or an organic group, $X^1$ and $X^2$ are independently O, S or $NR^4$, and $R^4$ is a halogen atom or an organic group. In general, $R^1$ can be $C_1$-$C_{10}$ alkylene group, $C_4$-$C_{20}$ arylene group, halogenated forms of these groups, optionally with other substituents and/or heteroatoms and/or rings. $R^2$ can independently be a halogen atom, a $C_1$-$C_{10}$ alkyl group, a $C_4$-$C_{20}$ arylene group, halogenated forms of these groups, optionally with other substituents and/or heteroatoms and/or rings. If $R^2$ are organic groups, a plurality of $R^2$ groups can form bonds with each other to form a ring. In some embodiments of interest, $R^1$ is absent such that the overall group linked by $R^1$ reduces to an oxalato group (—$C_2O_2$—). Compositions of particular interest are represented by formulas where the $R^2$ groups are halogen atoms, e.g., F, and $X^1$ and $X^2$ are O atoms. The '896 patent exemplified $LiBF_2C_2O_4$ (lithium difluoro(oxalato) borate as an electrolyte or in an electrolyte blend. The stabilization effectiveness of lithium difluoro(oxalato) borate for high voltage batteries with a lithium rich metal oxide cathode active material has been demonstrated in the '019 application cited above.

Other lithium salts with anions based on complexes are described further in U.S. Pat. No. 6,787,267 to Tsujioka et al. (the '267 patent), entitled "Electrolyte for Electrochemical Device," incorporated herein by reference. The '267 patent describes electrolytes represented by a formula:

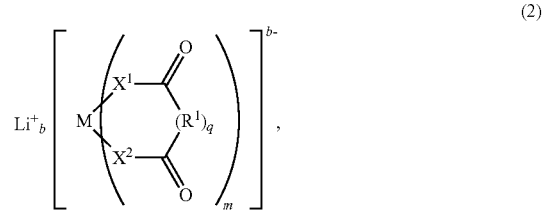

The same notation is used for moieties in formula (2) as is used for formula (1) above. One compound of interest within this genus is $LiB(C_2O_4)_2$, i.e. lithium bis(oxalato)borate.

In summary, various useful lithium salt additives are described above, and particularly suitable lithium salt additives of the electrolyte described herein include lithium difluoro oxalato borate (LiDFOB), lithium bis(oxalato)borate (LiBOB), lithium fluorododecaborate ($Li_2B_{12}H_xF_{12-x}$ (x=0-3)), lithium (bis)trifluoromethane sulfonimide, or a combination thereof. Lithium salt additives have been found that improve the cycling performance of the high voltage batteries. The effectiveness of these additives to stabilize the solvent electrolyte layer of the anode is described in Liu et al., "Effect of electrolyte additives on improving the cycle and calendar life of graphite/Li$_{1.1}$(Ni$_{1/3}$Co$_{1/3}$Mn$_{1/3}$)$_{0.9}$O$_2$ Li-ion cells, J. Power Sources, Vol. 174, pp: 852-855 (2007), incorporated herein by reference.

Cathode Stabilization Additives

Stabilizing agents for positive electrode active materials have been found to be effective at significantly improving cycling for lithium rich metal oxides, even in circumstances in which the active materials have a stabilizing inorganic coating. Classes of effective cathode stabilization agents include PF$_5$ complexing agents, thiophene and thiophene derivatives and LiF with a dissolving agent. The cathode stabilization agents have been found to decrease manganese leaching from the positive electrode during the first cycle activation and to improve cycling. Thus, the evidence significantly supports the idea that the agents are effective to stabilize the positive electrode active material with respect to etching or other detrimental effects of reactive species formed by the electrolyte. The electrolyte generally comprises cathode stabilization agents in amounts from about 0.001 weight percent to about 0.4 wt %, in further embodiments from about 0.0025 wt % to about 0.3 wt % and in additional embodiments from about 0.005 wt % to about 0.25 wt %. For embodiments with LiF stabilizing agent, an anion complexing agent, to facilitate solubilization of the LiF, can be added, for example, approximately in an equal molar amount as the LiF stabilizing agent. More generally, the anion complexing agent can be added in an amount by moles from about 0.25 to about 2 times the molar amount of LiF, in further embodiments from about 0.5 to about 1.5 times the molar amount of LiF, and in additional embodiments from about 0.85 to about 1.4 times the molar amount of LiF. A person of ordinary skill in the art will recognize that additional ranges of stabilization agent concentrations within the explicit ranges above are contemplated and are within the present disclosure.

In solution, PF$_6^-$ is believed to be in equilibrium with F$^-$+PF$_5$, and PF$_5$ is a strong Lewis acid. PF$_5$ complexing agents are believed to complex with the PF$_5$ to inhibit further reactions, such as with water contaminants, that can result in etching of the cathode active material. PF$_5$ complexing agents include, for example, dimethyl methylphosphonate, hexamethoxycyclotriphosphazene, hexamethylphosphoramide, pyridine, dimethyl acetamide, tris(2,2,2-trifluoroethyl) phosphite and combinations thereof. The effectiveness of dimethyl methylphosphonate with respect to stabilization of lithium rich metal oxides is demonstrated in the examples below. The stabilizing properties of dimethyl acetamide with respect to LiPF$_6$ based electrolytes is described in Li et al., "Inhibition of the Detrimental Effects of Water Impurities in Lithium-Ion Batteries," Electrochemical and Solid State Letters, 10(4), A115-A117 (2007), incorporated herein by reference. The complexation and stabilizing functions of pyridine, hexamethoxycyclotriphosphazine and hexamethylphosphoramide with respect to LiPF$_6$ based electrolytes is described in Li et al., "Additives for Stabilizing LiPF$_6$-Based Electrolytes Against Thermal Decomposition," Journal of the Electrochemical Society, 152(7), A1361-A1365 (2005), incorporated herein by reference. The stabilization effects of tris(2,2,2-trifluoroethyl) phosphite with respect to LiPF$_6$-based electrolytes is described further in Zhang et al., "Tris(2,2,2-trifluoroethyl) phosphite as a co-solvent for nonflammable electrolytes in Li-ion batteries," Journal of Power Sources, 113, 116-172 (2003), incorporated herein by reference. The common features of the complexation agents generally can be identified as their Lewis base characteristic.

Thiophene (C$_4$H$_4$S) and thiophene derivatives can polymerize in situ to form polythiophene, which can be an electrically conductive polymers. Suitable derivatives include, for example, alkyl thiophene, such as 3-hexyl thiophene, ethylene dioxythiophene, and the like. Suitable thiophene derivatives are generally at the 3-position or at the 3- and 4-positions to provide for desired polymerization, and suitable derivatives generally can have 3- and/or 3-position substitutions that are linear, branched or cyclic aliphatic groups, for example, with one to carbon atoms and optionally with heteroatom substitutions or functional groups. For convenience, thiophene and thiophene derivatives can be conveniently referred to as thiophene monomers to indicate the maintenance of the polymerization aspect of the composition. Electrolytes with thiophene or ethylene dioxythiophene is described further in Lee cited above, and electrolytes with 3-hexylthiophene is described further in Abouimrane cited above.

LiF can stabilize the PF$_6^-$ anion in the electrolyte solution, but LiF has a low solubility in the non-aqueous solvents. To increase the solubility, an anion complexing agent can be added to increase the solubility of the LiF. The use of anion complexing agents to dissolve in situ generated LiF is described in terms of broad genuses in published U.S. patent application 2006/0210883 to Chen et al. (Chen patent), entitled "Non-Aqueous Electrolytes for Lithium Ion Batteries," incorporated herein by reference. In particular, as indicated in the Chen patent, the anion complexing compounds can be as follows.

(1)

where R$_1$, R$_2$, and R$_3$ are independently halogen, alkyl, aryl, haloalkyl, haloaryl, or OR$_4$; in addition any two of R$_1$, R$_2$, R$_3$, and R$_4$, together with the atoms to which they are attached, can form a heterocyclic ring having 5-9 members, and R$_4$ is at each occurrence independently alkyl, aryl, haloalkyl, or haloaryl. In some embodiments halogens can be selected from Cl, F, Br, and I, and a group having a plurality of halogens may have all the same halogen or different halogens.

(2)

where R$_5$, R$_6$, R$_7$ and R$_8$ are independently halogen, alkyl, aryl, haloalkyl, or haloaryl; and L is a C$_{1-6}$ alkylene group, optionally substituted with one or more halogens. Halogens can be selected from Cl, F, Br, or I, and a group substituted with a plurality of halogens may have all the same halogen or different halogen atoms.

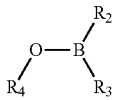
(3)

in which $R_2$, $R_3$ and $R_4$ are as defined above in reference to equation (1).

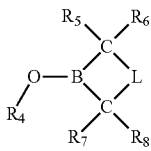
(4a)

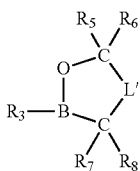
(4b)

where $R_3$, $R_5$, $R_6$, $R_7$, $R_8$ and L are defined above; and L' is a $C_{1-5}$ alkylene group, optionally substituted with one or more halogens.

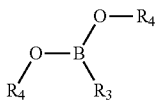
(5)

where $R_2$, $R_3$ and $R_4$ are as defined above in reference to formula (1).

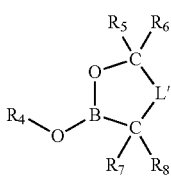
(6a)

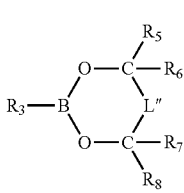
(6b)

where $R_3$, $R_5$, $R_6$, $R_7$, $R_8$ and L' are defined above; and L" is a $C_{1-3}$ alkylene group, optionally substituted with one or more halogens.

(7)

where $R_4$ are defined above in the context of equation (1).

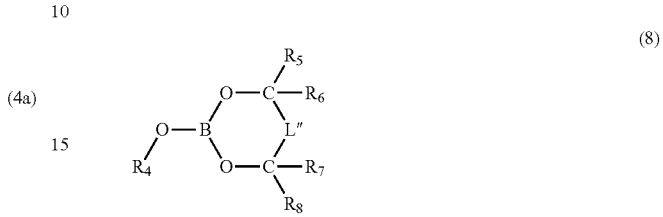
(8)

where $R_5$, $R_6$, $R_7$, and $R_8$ are defined above; and L" is absent or is a $C_{1-3}$ alkylene group, such as a methylene group, optionally substituted with one or more halogens.

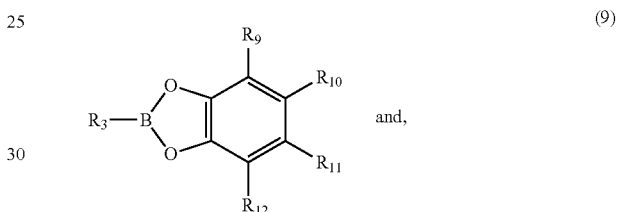
(9)

and,

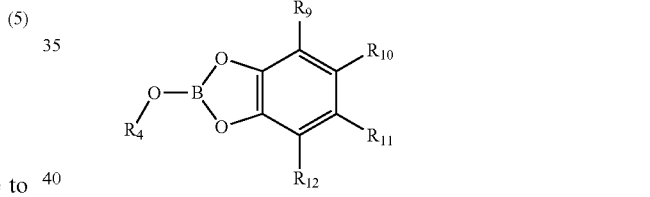
(10)

where $R_4$ is defined above and $R_9$, $R_{10}$, $R_{11}$ and $R_{12}$ are independently hydrogen, halogen, alkyl, aryl, haloalkyl, haloaryl.

Specific anion complexing compounds of interest are summarized as tris(1,1,1,3,3,3-hexafluoro-propan-2-yl)borate, tris(1,1,1,3,3,3-hexafluoro-2-phenyl-propan-2-yl)borate, tris(1,1,1,3,3,3-hexafluoro-2-(trifluoromethyl)propan-2-yl) borate, triphenylborate, tris(4-fluorophenyl)borate, tris (2,4-difluorophenyl)borate, tris(2,3,5,6-tetrafluorophenyl) borate, tris(pentafluorophenyl)borate, tris(3-trifluoromethylphenyl) borate, tris(3,5-bis(trifluoromethyl) phenyl)borate, tris(pentafluorophenyl) borane, 2-(2,4-difluorophenyl)-4-fluoro-1,3,2-benzodioxaborole, 2-(3-trifluoromethylphenyl)-4-fluoro-1,3,2-benzodioxaborole, 2,5-bis(trifluoromethyl)phenyl-4-fluoro-1,3,2-benzodioxaborole, 2-(4-fluorophenyl)-tetrafluoro-1,3,2-benzodioxaborole, 2-(2,4-difluorophenyl)-tetrafluoro-1,3,2-benzodioxaborole, 2-(pentafluorophenyl)-tetrafluoro-1,3,2-benzodioxaborole, 2-(2-trifluoromethyl)phenyl-tetrafluoro-1,3,2-benzodioxaborole, 2,5-bis(trifluoromethyl)phenyl-tetrafluoro-1,3,2-benzodioxaborole, 2-phenyl-4,4,5,5-tetrakis(trifluoromethyl)-1,3,2-benzodioxaborolane, 2-(3,5-difluorophenyl)-4,4,5,5-tetrakis(trifluoromethyl)-1,3,2-dioxaborolane, 2-pentafluorophenyl-4,4,5,5-tetrakis (trifluoromethyl)-1,3,2-dioxaborolane, bis(1,1,1,3,3,3- hexafluoroisopropyl)phenyl boronate, bis(1,1,1,3,3,3-hexafluoroisopropyl)-3,5-difluorophenylboronate, bis(1,1,1,3,3,3-hexafluoroisopropyl)(pentafluorophenyl)boronate, or a mixture of any two or more thereof.

In some embodiments, anion complexing agents include, for example, tris(pentafluorophenyl)borane, pentafluorophenylboron oxalate, tris(2H-hexafluoroisopropyl) borate, 2-(pentafluorophenyl)-tetrafluoro-1,3,2-benzodioxaborole, 2-(pentafluorophenyl)-4,4,5,5-tetrakis(trifluoromethyl)-1,3,2-dioxaborolane, and combinations thereof. Use of tris(pentafluorophenyl)borane as a solubilizing agent for LiF is described further in Sun et al., "Improved Elevated Temperature Cycling of $LiMn_2O_4$ Spinel Through the Use of a Composite LiF-Based Electrolyte," Electrochem. Solid-State Lett., 4(11), A184-A186 (2001), incorporated herein by reference. The synthesis and use of tris(2H-hexafluoroisopropyl) borate as an additive is described further in Sun et al., "A New Additive for Lithium Battery Electrolytes Based on an Alkyl Borate Compound," J. Electrochemical Society, 149(3), A355-A359 (2002), incorporated herein by reference. The synthesis and use of 2-(pentafluorophenyl)-tetrafluoro-1,3,2-benzodioxaborole, 2-(pentafluorophenyl)-4,4,5,5-tetrakis(trifluoromethyl)-1,3,2-dioxaborolane as additives is described further in Lee et al., "Synthesis and Study of New Cyclic Boronate Additives for Lithium Battery Electrolytes," J. Electrochemical Society, 149(11), A1460-A1465 (2002), incorporated herein by reference.

The extent to which the cathode stabilization agents, stabilize the positive electrode during cycling can be evaluated by determining the concentration of transition metals leached from the positive electrode. In particular, in some circumstances, deterioration of the positive electrode active material during activation is found to result in decomposition of the material that results in dissolution of transition metals from the material into the electrolyte and ultimate migration of the transition metal atoms to the negative electrode. It can be expected that the decomposition of the positive electrode active material may result in lost capacity during cycling as well as possibly less stability during cycling. The measurement of the transition metal content in the negative electrode can be used as one measure of the stability of the positive electrode active material along with measurements of the rate of fade of capacity with cycling and/or changes in average voltage.

Organic Anode Stabilizing Additives

As noted above, the electrolyte can also comprise an organic additive to stabilize the anode during activation and cycling. Some additives are potentially suitable as solvents, but beneficial effects of the compositions are observed at additive concentrations. For example, one class of additives relate to carbonates. Carbonates have a structure R—OCOO—R', with selected substituents R and R'. Carbonate additives of interest include, vinyl carbonate and vinylethylene carbonate.

Halogen substituted gamma-butyrolactones are suitable additives to reduce reactions at the negative electrode during cycling through the formation of a stable film. Suitable additive compositions include, for example, fluoro γ-butyrolactone, difluoro γ-butyrolactone, chloro γ-butyrolactone, dichloro γ-butyrolactone, bromo γ-butyrolactone, dibromo γ-butyrolactone, nitro γ-butyrolactone, cyano γ-butyrolactone, and combinations thereof. These additives are discussed further in U.S. Pat. No. 7,491,471 to Yamaguchi et al., entitled "Electrolyte for Lithium Secondary Battery and Lithium Secondary Battery Comprising the Same," incorporated herein by reference.

Another group of additives comprise monomers that are capable for undergoing anionic polymerization. During the formation of the battery, a protective film can form on the negative electrode active materials. Suitable monomers can include, for example, isoprene, styrene, 2-vinylpyridine, 1-vinylimidazole, butyl acrylate, ethyl acrylate, methyl methacrylate, N-vinylpyrrolidone, ethyl cinnamate, methyl cinnamate, ionone and myrcene. The use of these monomers as battery additives is described further in U.S. Pat. No. 6,291,107 to Shimizu, entitled "Non-Aqueous Electrolyte Battery," incorporated herein by reference.

Nitrogen containing heterocyclic compounds have been identified as additives for improving high temperature storage characteristics as well as for forming SEI layers. Among other suitable additives, pyrrolidine compounds have been identified, including, for example, 1-alkyl (or alkenyl)pyrrolidone compounds, such as 1-methyl-2-pyrrolidone, 1-ethyl-2-pyrrolidone, 1-vinyl-2-pyrrolidone, 1,5-dimethyl-2-pyrrolidone, 1-isopropyl-2-pyrrolidone, 1-n-butyl-2-pyrrolidone, 1-methyl-3-pyrrolidone, 1-ethyl-3-pyrrolidone, and 1-vinyl-3-pyrrolidone; 1-arylpyrolidone compounds, such as 1-phenyl-2-pyrrolidone and 1-phenyl-3-pyrrolidone; N-alkylsuccinimide compounds, such as N-methylsuccinimide, N-ethylsuccinimide, N-cyclohexylsuccinimide and N-isobutylsuccinimide; N-alkenylsuccinimide compounds, such as N-vinylsuccinimide; and N-(hetero)arylsuccinimide compounds such as N-phenylsuccinimide, N-(p-tolyl)succinimide, and N-(3-pyridyl-)succinimide. The use of these heterocyclic compounds along with other additive options is described further in published U.S. Patent Application No. 2003/0165733 to Takehara et al., entitled "Nonaqueous Electrolyte Solution and Secondary Battery Employing the Same," incorporated herein by reference. Heterocyclic additives including derivatives of succinimide, phthalimide and maleimide are described in published U.S. Patent Application No. 2006/0172201 to Yasukawa et al., entitled "Non-Aqueous Electrolyte and Lithium Secondary Battery Using the Same," incorporated herein by reference. Imide stabilizing compounds for lithium metal secondary batteries include N-hydroxy phthalimide, N-hydroxysuccinimide, N,N-disuccinimidyl carbonate, 1,5-bis (succinimidoxycarbonyloxy) pentane, 9-fluorenylmethyl-N-succinimidyl carbonate, N-(benzyloxycarbonyloxy) succinimide and Z-glycine-N-succinimidyl ester, as described in U.S. Pat. No. 6,645,671 to Tsutsumi et al., entitled "Lithium Secondary Battery, Anode for Lithium Secondary Battery, and Method for Manufacturing the Anode," incorporated herein by reference.

In some embodiments, the weight percent of the organic additive in the electrolyte is from about 0.001 weight percent to about 15 weight percent, in further embodiments from about 0.01 weight percent to about 10 weight percent, in additional embodiments from about 0.05 weight percent to about 5 weight percent, and in other embodiments from about 0.1 weight percent to about 3 weight percent. A person of ordinary skill in the art will recognize that additional ranges of values within the explicit weight percent ranges above are contemplated and are within the present disclosure.

Battery Performance

Batteries formed with electrolytes incorporating improved organic stability additives described herein can provide superior performance at high voltage operation over a wide temperature range and relatively high charge/discharge rates. The batteries can also exhibit excellent cycling properties over a large number of cycles, which indicates good stability of the electrolyte. With respect to rate, the notation C/x implies that the battery is charge (discharged) at a rate to fully charge (discharge) the battery to the selected voltage minimum in x hours. In general, the batteries are charged to 4.6V in the first cycle at a low rate, such as C/10. For additional cycling a different charge voltage can be selected, and performance values below are referenced to selected charge voltages. A desirable multistep formation protocol can be used, as described further in published U.S. Patent Application No. 2011/0236751 to Amiruddin et al., entitled "High Voltage Battery Formation Protocols and Control of Charging and Discharging For Desirable Long Term Cycling Performance," incorporated herein by reference.

In general, batteries using the electrolytes described herein can maintain good cycling stability at moderate specific capacities out to large number of cycles. In general, the specific capacity depends on the extent of lithium enrichment, and for some embodiments, the specific capacity at room temperature can be at least about 140 mAh/g, in further embodiments at least about 145 mAh/g and in further embodiments at least about 150 mAh/g. For example, the batteries cycled at room temperature in the voltage window of 4.35V to 2.5 V at a rate of 1C charge and 1C discharge can retain at least about 85% capacity out to 500 cycles, in some embodiment at least about 88% capacity, in further embodiment at least about 90% capacity, and in additional embodiment at least about 94% capacity relative to the fifth cycle capacity. A person of ordinary skill in the art will recognize that additional ranges of specific capacity and cycling stability values within the explicit specific ranges above are contemplated and are within the present disclosure. The batteries can be initially subjected to formation cycles, with an initial charge to 4.2V at a rate of C/10 in which the voltage is held for 4 hours. Then, the batteries are stored in an open circuit for 7 days of storage. After the storage, the batteries are charged to 4.35V at a rate of C/10 and then discharged to 2V at a rate of C/10. Three additional charge/discharge cycles are performed from 4.35V to 2.5V at a rate of C/5 prior to performing the 1C cycling.

As discussed above, the manganese dissolution from the positive electrode can be a measure of positive electrode stability. As used herein, to determine manganese dissolution from the positive electrode, the manganese concentration in the negative electrode is measured after storing the corresponding batteries for a time period, as manganese leached from the positive electrode is expected to become incorporated in the negative electrode. To determine manganese concentration in the negative electrode, the batteries are first charged to 4.35V at constant current, e.g., C/10, and then the battery is discharged to 2.0V at C/10. After a second charge to 4.35V at C/10, the batteries are stored for a week at 60° C. at 100% state of charge. The batteries are then fully discharged and disassembled to remove the anode. The anodes are then analyzed for metal content using inductively coupled plasma-atomic emission spectroscopy (ICP-AES) analysis. In embodiments based on a layered-layered lithium rich manganese nickel cobalt oxide with an optional dopant, the manganese dissolution as determined by a measurement of metal in the anode can be no more than about 140 parts per million by weight (ppm), in further embodiments no more than about 110 ppm and in other embodiments from about 65 ppm to about 110 ppm by weight. A person of ordinary skill in the art will recognize that additional ranges of amounts of manganese dissolution into the anode within the explicit ranges above are contemplated and are within the present disclosure.

EXAMPLES

To demonstrate the effect of electrolyte additives on the cycling stability of positive electrodes, several batteries were constructed. Each battery comprised a positive electrode, a negative electrode and an electrolyte, with or without a stability additive relative to a reference electrolyte composition. The batteries were formed as single layer coin cell or pouch cell batteries having a separator disposed between the positive and negative electrodes.

The positive electrodes comprised lithium metal oxides that are high capacity positive electrode material approximately described by the formula $Li_{1+b}Ni_{\alpha}Mn_{\beta}Co_{\gamma}A_{\delta}O_2$ with $0.05 \leq b \leq 0.125$, $0.225 \leq \alpha \leq 0.35$, $0.35 \leq \beta \leq 0.45$, $0.15 \leq \gamma \leq 0.3$, $0 \leq \delta \leq 0.05$, where A is a metal different from lithium, nickel, manganese and cobalt, and up to five mole percent of the oxygen can be replaced with a fluorine dopant. Positive electrodes were formed from the high capacity positive electrode material powders by initially mixing it thoroughly with conductive carbon to form a homogeneous powder mixture. Separately, polyvinylidene fluoride (PVDF, KF7305™ from Kureha Corp., Japan) was mixed with N-methyl-pyrrolidone (NMP, Sigma-Aldrich). The homogeneous powder mixture was then added to the PVDF-NMP solution and mixed for about 2 hours to form homogeneous slurry. The slurry was applied onto an aluminum foil current collector to form a thin, wet film and the laminated current collector was dried in vacuum oven at 110° C. for about two hours to remove NMP. The laminated current collector was then pressed between rollers of a sheet mill to obtain a desired lamination thickness. The dried positive electrode comprised from about 88 weight percent to 94 weight percent active metal oxide, from about 2 weight percent to about 7 weight percent conductive carbon, and from about 2 weight percent to about 6 weight percent polymer binder. The loading level on one side of the electrode is from about 7 mg/cm² to about 17.00 mg/cm². The electrodes have a density from about 2.4 g/mL to about 3.2 g/mL. The total electrode structure thickness is from about 45 micron to about 150 micron.

The batteries comprised different electrolyte compositions as described in detail in the individual examples below.

A negative electrodes were formed from graphitic carbon. The graphitic carbon based negative electrodes comprised at least about 75 weight percent graphite and at least about 1 weight percent acetylene black with the remaining portion of the negative electrode being polymer binder. To form the negative electrode, carboxymethyl cellulose binder was mixed in water to dissolve the binder. Then, the acetylene black was stirred with the binder solution to form a good mixture, and then the active graphite is added to the mixture to form a slurry. The slurry was applied as a thin-film to a copper foil current collector. A negative electrode was formed by drying the copper foil current collector with the thin wet film in vacuum oven at 110° C. for about two hours. The negative electrode material was pressed between rollers of a sheet mill to obtain a negative electrode with desired thickness.

For batteries with the lithium foil counter electrodes, the electrodes were placed inside an argon filled glove box for the fabrication of the coin cell batteries. Lithium foil (FMC Lithium) having thickness of roughly 125 micron was used as a negative electrode. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles. Coin cell batteries with graphite carbon as negative electrode were formed following similar procedures.

Pouch cell batteries were constructed for example with a single positive electrode plate and negative electrode plate or in some embodiments with a plurality of positive electrode plates and negative electrode plate, e.g., with 15-40 negative electrode plates alternating with positive electrode plates such that a negative electrode plate was positioned at both ends of the stack, i.e., there is one fewer positive electrode plates than negative electrode plates. Positive electrodes were formed as described above with the current collector coated on both sides and with a portion of the aluminum current collector left uncoated to serve as tab attachment points. Graphitic carbon electrode is used as negative electrode. With respect to batteries described below with approximately 1 Ah capacity, the negative electrodes have a surface area of about 3.1 cm×4.35 cm and the positive electrodes had a surface area of about 3 cm×4.25 cm. The positive and negative electrodes were alternately stacked and a single trilayer (polypropylene/polyethylene/polypropylene) micro-porous separator (2320 from Celgard, LLC, NC, USA) was folded in a Z-pattern with an appropriate electrode in each fold and a negative electrode at the surface of the folded structure so that a negative electrode is located at the ends of the stacks. Nickel and aluminum tabs were then attached to the negative and positive electrodes, respectively, and the stack was placed in a pouch bag and sealed at three edges. Electrolyte was then added to the stack through the fourth, open edge and the fourth edge was then sealed. Single layer pouch cell batteries were similarly formed with one negative electrode plate and one positive electrode plate separated by a single sheet trilayer separator. Unless indicated otherwise, the batteries during the first cycle were activated to 4.6V using a two step formation protocol as described in published U.S. patent application 2011/0236751 to Amiruddin et al., entitled "High Voltage Battery Formation Protocols and Control of Charging and Discharging for Desirable Long Term Cycling Performance," incorporated herein by reference.

Example 1—Effect of Electrolyte Additives on Cycling Stability

This Example demonstrates the effect of electrolyte stability additives on the cycling stability of positive electrodes.

To demonstrate cycling stability 10 batteries were formed (labeled batteries 1-10). Batteries 1-6 were formed as pouch cell batteries and batteries γ-10 were formed as coin cell batteries, as described above. Each battery had an electrolyte that was formulated relative to a reference electrolyte comprising 1.5 M $LiPF_6$ in a 1:3 mixture of ethylene carbonate ("EC"):dimethyl carbonate ("DMC") with 3 wt % lithium difluoro(oxalato)borate ("LiDFOB"). Batteries 1, 2 and 6 were fabricated using the reference electrolyte. Batteries 1 and 2 were substantially the same. Relative to the reference electrolyte composition, the electrolyte for batteries 3-5 and γ-9 further comprised, as a stability additive, 0.1 wt % dimethyl methylphosphonate ("DMMP"), thiophene ("TP") or 3-Hexylthiophene ("HTP"), respectively. The electrolyte for battery 10 comprised, as a stability additive, 0.01 wt % LiF and tris(pentafluorophenyl)borane ("TPFPB"). To form the electrolyte of battery 10, TPFPB was added to a solution of LiF and reference electrolyte at a molar concentration equivalent to LiF concentration in the solution. Table 1 lists the parameters for each battery.

TABLE 1

| Battery Number | Battery Type | Stability Additive |
|---|---|---|
| 1 | Pouch Cell | None |
| 2 | Pouch Cell | None |
| 3 | Pouch Cell | DMMP |
| 4 | Pouch Cell | TP |
| 5 | Pouch Cell | HTP |
| 6 | Coin Cell | None |
| 7 | Coin Cell | DMMP |
| 8 | Coin Cell | TP |
| 9 | Coin Cell | HTP |
| 10 | Pouch Cell | LiF + TPFPB |

To demonstrate cycling performance, after fabrication, batteries 1-5 and 10 were initially charged to 4.2V at a C/10 rate and then held at a constant voltage for 4 hours. Then, the batteries were stored for 7 days with an open circuit. After the open circuit storage, the batteries were charged to 4.35V at a rate of C/10, and then discharged to 2 V at a rate of C/10. After the first cycle, the batteries were cycled for three cycles between 4.35V and 2.5V at a rate of C/5. Thereafter, the batteries were cycled for at least 850 cycles between 2.5V and 4.35V at a rate of 1C for both charge and discharge cycle stages. During the charging to 4.35 V, the voltage was held at 4.35V for 1 hour or until the current dropped below C/20 before discharging.

FIGS. 2-5 are graphs showing plots of discharge capacity versus cycle number for batteries 1, 3-5 and 10 during cycling. Referring to the figures, the addition of the respective stability additives to the reference electrolyte significantly increased cycling performance of the batteries. The figures demonstrate that over 800 cycles, battery 1 (reference electrolyte) had a 11% capacity fade while battery 3 (DMMP) demonstrated only a 5% capacity fade and batteries 4 (TP) and 5 (HTP) demonstrated only a 5% capacity. Similarly, battery 2 (reference electrolyte) had a capacity fade of about 20% and battery 10 had capacity fade of about 26% after 1,600 cycles. Capacity fade was calculated as the change in discharge capacity relative to the discharge capacity of the 8th cycle.

To demonstrate rate performance, batteries 6-9 were initially charged to 4.35V following the procedure above for batteries 1-5 and 10. The batteries were then cycled between 4.35V and 2.5V at a rate of C/10, C/5, C/3, 1C and 2C for cycles 1-5, respectively and the discharge capacity was measured for each cycle. Table 2 displays the specific discharge capacities of the batteries at the different rates. Referring to table 2, at all rates tested, the specific discharge capacities of batteries 6-9 were similar, indicating the capacity was not significantly affected by the presence of stability additives at the tested rates.

TABLE 2

| Battery Number | C/10 | C/5 | C/3 | 1C | 2C |
|---|---|---|---|---|---|
| 6 | 178 | 174 | 172 | 165 | 160 |
| 7 | 178 | 175 | 173 | 167 | 162 |

TABLE 2-continued

| Battery Number | C/10 | C/5 | C/3 | 1C | 2C |
|---|---|---|---|---|---|
| 8 | 176 | 171 | 168 | 159 | 152 |
| 9 | 176 | 172 | 169 | 162 | 157 |

Example 2—Effect of Electrolyte Additives on Stability of Positive Electrodes Following a Formation Charge This Example demonstrates the effect of electrolyte stability additives on the stability of positive electrodes following a formation charge.

To demonstrate stability, 6 sets of batteries. The batteries were formed as described in Example 1. Relative to the reference electrolyte composition, the electrolyte of batteries from sets 1 and 2 further comprised, as a stability additive, 0.01 wt % LiF and either tris(pentafluorophenyl)borane ("TPFPB") (battery set 1) or tris(2H-hexafluoroisopropyl)borate ("THFPB") (battery set 2). To form the electrolytes of batteries from sets 1 and 2, TPFPB or THFPB was added to a solution of LiF and reference electrolyte at a molar concentration equivalent to LiF concentration in the solution. Batteries from sets 3-5 were formed substantially the same as batteries 2-4 of Example 1.

Mn dissolution studies were also performed on the batteries of sets 1-5 to characterize the relative effectiveness of the various electrolyte stability additives on the positive electrodes. The presence of Mn in the anode has been associated with dissolution of Mn from the positive electrode into the electrolyte and subsequent transport across the separator and into the positive electrode resulting in battery capacity loss. Accordingly, lower Mn concentrations in the negative electrode can indicate greater cycling stability. To perform the Mn dissolution studies, after fabrication, the batteries was charged to 4.35V at constant current, e.g., C/10, and then discharged to 2.5V. After a second charge to 4.35V, the batteries were stored for a week at 60° C. at 100% state of charge. The batteries were then fully discharged and disassembled to remove the anode. The anodes are then analyzed for metal content using inductively coupled plasma-atomic emission spectroscopy (ICP-AES) analysis. Table 3 shows the results of the Mn dissolution study.

Referring to Table 3, the results demonstrate the anodes of battery 3 had the lowest average Mn concentration (59 ppm by weight), suggesting that the DMMP additive had the greatest stabilizing effect on the positive electrode during formation relative to the other tested electrolyte additives, while the anodes of battery set 4 had the highest average Mn concentration (115 ppm by weight), suggesting the TP additive had the least stabilizing effect on the positive electrode during formation relative to the other tested electrolyte additives. A control battery, battery 1, exhibited a manganese dissolution of about 99 ppm by weight. Referring again to Table 3, the anodes of the batteries from sets 1 and 2, having stability additives comprising LiF and either TPFPB or THFPB, respectively, had similar average Mn concentrations (75 ppm by weight and 72 ppm by weight, respectively). The average Mn concentrations in the anodes of the batteries from sets 1 and 2 were lower than those of anodes from the batteries of sets 4 (115 ppm by weight) and 5 (82 ppm by weight).

TABLE 3

| Battery Set | Mn concentration (ppm by weight) | Formulation |
|---|---|---|
| 1 | 78 | 0.01% LiF + TPFPB |
|   | 71 |   |
| 2 | 71 | 0.01% LiF + THFPB |
|   | 82 |   |
|   | 63 |   |
| 3 | 57 | 0.1% DMMP |
|   | 66 |   |
|   | 53 |   |
| 4 | 113 | 0.1% TP |
|   | 104 |   |
|   | 127 |   |
| 5 | 69 | 0.1% HTP |
|   | 80 |   |
|   | 98 |   |

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. An electrolyte composition comprising a solvent, from about 1.1M to about 2.5M lithium electrolyte salt, and from about 0.02 to about 0.5 weight percent thiophene or thiophene derivatives, wherein the solvent consists essentially of fluoroethylene carbonate, dimethyl carbonate and optionally methyl ethyl carbonate, wherein the solvent comprises no more than about 20 weight percent fluoroethylene carbonate relative to a total electrolyte weight, and wherein the lithium electrolyte salt is selected from the group consisting of $LiPF_6$, $LiBF_4$ and combinations thereof.

2. The electrolyte composition of claim 1 further comprising from about 1 to about 5 weight percent LiBOB, LiDFOB or combinations thereof.

3. The electrolyte composition of claim 1 wherein the solvent comprises methyl ethyl carbonate in an amount of no more than about 20 weight percent relative to a total electrolyte weight.

4. The electrolyte composition of claim 1 wherein the solvent comprises methyl ethyl carbonate in an amount of no more than about 30 weight percent relative to a total electrolyte weight.

5. The electrolyte composition of claim 1 wherein the solvent consists essentially of fluoroethylene carbonate and dimethyl carbonate at a weight ratio from about 1:1 to about 1:4.

6. The electrolyte composition of claim 1 wherein the electrolyte composition comprises from about 1.15M to about 1.6M lithium electrolyte salt.

7. A lithium ion battery comprising a positive electrode, a negative electrode, a separator separating the positive electrode and negative electrode and the electrolyte composition of claim 1, wherein the positive electrode comprises an active material comprising a lithium rich metal oxide approximately represented by the formula $Li_{1+b}Ni_\alpha Mn_\beta Co_\gamma A_\delta O_{2-z}F_z$, where b ranges from about 0.01 to about 0.3, α ranges from about 0 to about 0.4, β ranges from about 0.2 to about 0.65, γ ranges from 0 to about 0.46, δ ranges from 0 to about 0.15 and z ranges from 0 to about 0.2 with the proviso that both $\alpha$ and $\gamma$ are not zero, and where A is a metal element different from Ni, Mn, or Co.

8. The lithium ion battery of claim 7 wherein the inorganic stabilization coating comprises metal oxide, metal halide or a combination thereof with an average thickness from about 0.5 nm to about 12 nm.

9. The lithium ion battery of claim 7, wherein the solvent comprises methyl ethyl carbonate in an amount of no more than about 20 weight percent relative to a total electrolyte weight.

10. The lithium ion battery of claim 7 wherein the negative electrode comprises graphitic carbon.

11. The lithium ion battery of claim 7 wherein the positive electrode active material has a specific capacity of at least about 140 mAh/g at a 1C rate discharged from 4.35V to 2V and wherein the lithium ion battery has a capacity at a 500th cycle that is at least about 97.5% of a 5th cycle capacity when cycled at a discharge rate of 1C from 4.35V to 2.5V.

12. The lithium ion battery of claim 7 wherein the solvent consists essentially of fluoroethylene carbonate and dimethyl carbonate at a weight ratio from about 1:1 to about 1:4.

* * * * *